United States Patent [19]

Rogers et al.

[11] Patent Number: 5,466,385
[45] Date of Patent: Nov. 14, 1995

[54] GAS SPURGED CONTRIFUGATION METHOD

[75] Inventors: Ernest E. Rogers, Pleasant Grove; Kevin E. Collier, Kaysville, both of Utah

[73] Assignee: Charles W. Taggart, Salt Lake City, Utah

[21] Appl. No.: 383,891

[22] Filed: Feb. 6, 1995

Related U.S. Application Data

[60] Division of Ser. No. 149,994, Nov. 10, 1993, Pat. No. 5,387,342, which is a continuation-in-part of Ser. No. 896,185, Jun. 10, 1992.

[51] Int. Cl.⁶ .................................................. B01D 21/26
[52] U.S. Cl. .................. 210/787; 210/360.1; 210/380.1; 210/512.3; 210/221.2; 494/43; 494/50; 494/60; 55/459.1; 55/459.4
[58] Field of Search .............................. 210/360.1, 380.1, 210/787, 512.1, 512.3, 703, 221.2; 53/459.1, 459.4; 261/76; 494/43, 50, 60

[56] References Cited

U.S. PATENT DOCUMENTS 5,114,568  5/1992  Brinsmead et al. ................ 210/221.2

*Primary Examiner*—Robert A. Dawson
*Assistant Examiner*—David A. Refsnyder
*Attorney, Agent, or Firm*—Madson & Metcalf

[57] ABSTRACT

A separator for separating a first fluid from a second fluid through rotation about an axis of rotation, the first fluid having a density less than the density of the second fluid. In one embodiment, the separator includes a separation chamber mounted for rotation about the axis of rotation. A first weir is positioned in fluid communication with the separation chamber. A second weir is positioned over which the second fluid may pass to exit the separation chamber through a collection chamber. A fluid pressure chamber is positioned radially outwardly from the crest of the second weir to receive the second fluid as it passes over the second weir. The fluid pressure chamber is partially defined by an exit weir over which the second fluid may pass. A gas chamber is positioned in the passageway between the second weir and the exit weir and includes a gas escape passageway through which excess gas may escape from the gas chamber such that a gas barrier is formed to maintain the fluid level between the gas chamber and the fluid pressure chamber at the radial level of the gas escape passageway. A gas introduction passageway is provided through which gas may be introduced into the gas chamber.

10 Claims, 11 Drawing Sheets

GAS SPURGED CONTRIFUGATION METHOD

RELATED U.S. APPLICATION

This application is a divisional of prior U.S. application Ser. No. 08/149,994, now U.S Pat. No. 5,387,342 filed on Nov. 10, 1993 entitled CENTRIFUGAL SEPARATOR AND METHOD which is a continuation-in-part of U.S. patent application Ser. No. 07/896,185, filed Jun. 10, 1992 and entitled APPARATUS AND METHOD OF CENTRIFUGAL SEPARATING A FLUID MIXTURE INTO ITS COMPONENT PARTS.

BACKGROUND

1. The Field of the Invention

The present invention concerns separation apparatus and methods, and particularly those systems that separate two or more mixed fluid components through centrifugation.

2. Technical Background

Centrifugal systems for separation use centrifugal force generated through rotation to separate fluid components of differing densities. In many fundamental aspects, these systems are used as a substitute for and improvement on gravitational separation techniques and devices, since the gravitational force and the centrifugal force exerted on a fluid through rotation are identical in that they increase in magnitude as the fluid increases in mass. Those fluids with lesser density will be less influenced by the force and therefore less inclined toward the source of the force, the earth for gravitational, the outside of the rotating container for centrifugal, than fluids with greater density. The fluids will thus separate out and can be directed to separate collection ports by using weirs or other suitable separating structures. Centrifugal separation is often more desirable than gravitational because the force applied to the fluid can be controlled through rotation speed and can be made to be many times that of gravity.

A common example of fluid separation is that of oil from water. There are many situations in which separation of these two elements is desired, such as oil spills on an ocean or lake, mixing of the two fluids in a ship's bilge, gasoline spills, etc. The process of fluid separation is often important for maintenance of quality of life in a particular geographic area. These two fluids are susceptible to centrifugal separation because water is more dense than oil and thus will "sink" relative to the other under application of centrifugal force. This can easily be understood by the fact that oil floats on water in a gravitational field. Other fluid separation applications include wine clarification, waste-water treatment, blood plasma separation, and the like. Centrifugation is also used to separate solids out of liquids through sedimentation.

It is often desirable to separate out elements dispersed in solution or emulsion. Standard centrifugal separation equipment alone cannot carry out such a separation since the dissolved elements will move with the solution. A solvent must therefore be introduced into the fluid stream to extract the dissolved elements. Such a process requires that the solvent be thoroughly mixed with the fluid to extract all dissolved elements. The solvent and fluid are then separated through centrifugation. An example of this type of separation is solvent extraction and separation of transuranic elements from radioactive waste streams at nuclear processing plants.

Similarly, it has been found to be beneficial to add emulsion breaking additives to emulsions to cause them to separate under centrifugal action. These emulsion breakers break down the bonds which stabilize the emulsion. The two components which formed the emulsion may then be separated through centrifugation.

While many centrifugal separators have been designed to effect fluid separation on the basis of differential fluid density, such separators generally suffer from a variety of disadvantages. One common shortfall found in prior art centrifugal separators is their limited flow capacity. Many designs have substantial power requirements to overcome the effects of internal fluid shear while achieving rates of rotation necessary obtain effective separation.

Another disadvantage common in prior art centrifugal separators is the inability to separate fluids having varying density differentials. Many prior art centrifugal separators are designed for a single application, such as separating cream from milk, and work efficiently only when separating fluids that have predetermined densities. Those designs purporting to effectively separate fluids having a broad range of density differentials utilize complicated external control mechanisms to monitor and control the pressures and flow rates within the separator. Besides having only limited effectiveness, such designs are generally complicated to build and operate, making them economically inefficient for use in many applications.

In some situations it is desirable to separate two fluids having substantially similar densities. The separation of emulsions from an unemulsified component is one such situation. For example, when oil is mixed with water, as would occur at a crude oil spill in the sea, wave action often causes the oil to mix with the water to form a stable emulsion. Since many crude oils have densities close to that of water, and the emulsion is primarily composed of water, the emulsion cannot be separated from the water on the basis of density. Typical of prior art solutions to this problem is the application of chemical agents, or "emulsion breakers," that serve to disassemble the emulsion. This process generally results in unsatisfactory results because the processing time required to break up the emulsion requires low volume flow rates through the separator.

From the foregoing, it will be appreciated that it would be an advancement in the art to provide a centrifugal separator for effectively separating fluids having disparate densities which could operate at a substantially higher flow rate than prior art centrifugal separators.

It would be an additional advancement in the art to provide such a separator which would effectively separate fluids having a wide range of density differentials without requiring external control or adjustment of the separator.

It would be a further advancement in the art to provide such a separator having the capacity of separating fluids having similar densities, such as an emulsion, through the use of centrifugal forces.

Such a device and method are disclosed and claimed herein.

BRIEF SUMMARY AND OBJECTS OF THE INVENTION

In accordance with one embodiment of the invention, an apparatus for centrifugally separating into its component parts a mixture having immiscible component parts of a first liquid and a second liquid of differing densities comprises an elongate inlet shaft having an open receiving end for receiving the fluid mixture. An open discharge end is provided through which the mixture is delivered into the apparatus. A rotor is disposed substantially coaxially to and surrounding the inlet shaft and adapted for rotational movement thereabout. A housing surrounds the rotor for receiving and collecting the separated liquids from the rotor.

The rotor contains an optional mixing chamber around the inlet shaft with walls comprising the inlet shaft itself and a frustoconical center wall surrounding the inlet shaft. The rotor also includes an annular separation chamber which receives the mixture from the mixing chamber. The inner wall of the separation chamber is the frustoconical center wall. The outer wall of the separation chamber slopes oppositely the center wall.

An annular first weir is disposed at the large end of the separation chamber. A lighter liquid channel is formed between the first weir and the center wall, while a heavier liquid channel is formed between the first weir and the outer wall. A discharge passage for the lighter liquid is provided from the first weir to a collection chamber in the housing. A second weir is positioned beyond the first weir for the discharge of the heavier liquid into a second collection chamber in the housing.

In operation, first and second immiscible fluids in a fluid mixture are separated into their component parts by inputting the mixture through the inlet shaft into the approximate center of the rotor. The rotor is rotated, thereby causing the mixture to move down the slope of the center wall and flow over the edge thereof into the separation chamber. The centrifugal force imparted to the fluid mixture through rotation separates the mixture into its component parts in the separation chamber. The first liquid is discharged from the separation chamber through the first annular channel between the center wall and the first weir and is channeled to a first collection chamber. The second liquid is discharged from the separation chamber through the second channel between the outer wall and the first weir and is channeled to and over the second weir and into the second collection chamber.

In an alternative embodiment of the present invention, an apparatus for centrifugally separating into its component parts through solvent extraction a liquid mixture containing first and second immiscible liquids and contaminants dissolved or emulsified in the second liquid, is provided. The apparatus comprises a first separation chamber which separates the immiscible liquids, a first discharge channel for discharging the first liquid into a housing, a mixing chamber for mixing the second liquid with a solvent, a second separation chamber for separating the second liquid from the solvent, and second and third discharge channels for discharging the solvent and second liquid, respectively, into the housing.

In operation, the method for separating a mixture of first and second liquids into its component parts comprises injecting the mixture into a rotatable rotor, separating the first and second liquids from each other in a first separation chamber, discharging the first liquid from the rotor, injecting a solvent into the rotor, mixing the second liquid with the solvent, separating the second liquid from the solvent in a second separation chamber, discharging the solvent from the rotor, and discharging the second liquid from the rotor.

In a presently preferred embodiment of the invention, a separator for separating a first fluid from a second, more dense, fluid through rotation about an axis of rotation is provided. The separator includes an inlet duct with a receiving end and a discharge end.

A mixing chamber is positioned to receive fluid from the discharge end of the inlet duct. The mixing chamber is filled with flow disruption elements configured to induce turbulent flow of the fluid in the mixing chamber. The surface of the flow disruption elements may be made of a material having an affinity for one of the fluids, such as a lipophilic material.

A separation chamber is mounted for rotation about the axis of rotation. The separation chamber includes an inlet passageway, a first fluid outlet passageway, and a second fluid outlet passageway. The inlet passageway of the separation chamber is positioned in fluid communication with the discharge end of the inlet duct for receiving the fluid mixture and is spaced substantially from the first and second fluid outlet passageways. In a preferred embodiment, the separator also includes means for introducing gas into the separation chamber, such as a gas supply line attached for injection of gas into the inlet duct.

The separation chamber includes a plurality of radial plates spaced uniformly within the separation chamber. A portion of the plates are made of a material having an affinity for one of the fluids.

A first weir is positioned in fluid communication with the first outlet passageway of the separation chamber. The first weir includes a crest, extending substantially annularly about the axis of rotation, over which the first fluid may pass. It is preferred that the effective radius of the inner surface of the separating chamber is not substantially less than the radius of the crest of the first weir. A first fluid exit passage is provided for receiving the first fluid as it passes over the crest of the first weir.

The second fluid outlet passageway includes an inlet end in fluid communication with the separation chamber. The inlet end of the second fluid outlet passageway is positioned radially outwardly from the crest of the first weir. The second outlet passageway extends generally toward the axis of rotation and includes an exit end at least partially defined by a second weir.

The second weir includes a crest, extending substantially annularly about the axis of rotation, over which the second-fluid may pass to exit the second fluid outlet passageway. A fluid pressure chamber is positioned radially outwardly from the crest of the second weir to receive the second fluid as it exits the second fluid outlet passageway over the second weir.

An exit weir is also included which partially defines the fluid pressure chamber. The exit weir includes a crest, extending substantially annularly about the axis of rotation, over which the second fluid may pass to exit the fluid pressure chamber. A second fluid exit passage is included for receiving the second fluid as it passes over the crest of the exit weir.

The first fluid exit passage and the second fluid exit passage are in fluid communication with each other such that the air pressure in the first fluid exit passage remains approximately the same as the air pressure in the second fluid exit passage while maintaining the first fluid separated from the second fluid. In a preferred embodiment, the first fluid exit passage is configured to extend radially inwardly of the second weir and the second fluid exit passage without the first fluid exit passage crossing the path of the second fluid exit passage.

A gas chamber is positioned in fluid communication with the exit end of the second fluid outlet passageway and extends radially outwardly to the fluid pressure chamber. The gas chamber includes a gas escape passageway through which excess gas may escape from the gas chamber such that a gas barrier may be formed to maintain the fluid level between the gas chamber and the fluid pressure chamber at the radial level of the gas escape passageway.

A radial partition separates the gas chamber from the fluid pressure chamber. The radial partition has an edge about which water flows and over which gas from the gas chamber may pass to exit the gas chamber. In one embodiment, the edge defines the gas escape passageway. In a preferred alternative embodiment, the radial partition is configured with a radially adjustable hole. Radial adjustment of the hole is achieved by configuring the radial partition with a radial slot and a slot cover positioned to cover the radial slot. The slot cover is mounted for radial movement and configured with a hole which is aligned with a portion of the radial slot.

The separator further includes a gas introduction passageway through which gas may be introduced into the gas chamber. Means, such as a pump, are also provided for introducing a flow of gas into the gas introduction passageway. Rotation means, such as an electric motor, are also included for rotating the separation chamber about the axis of rotation.

A housing extends about the separation chamber. The housing comprises a first and a second fluid collection chamber. The first fluid collection chamber is positioned annularly about the axis of rotation and is in fluid communication with the first weir such that fluid passing over the first weir will enter the first fluid collection chamber. The second fluid collection chamber is positioned annularly about the axis of rotation and is in fluid communication with the second weir such that fluid passing over the second weir will enter the second fluid collection chamber. The first and second fluid collection chambers are in fluid communication with each other. A first and a second fluid exit duct are positioned in fluid communication with, and aligned tangentially to, the first fluid collection chamber and the second fluid collection chamber, respectively.

The housing also includes at least one air passageway placing the first and second fluid exit passages in fluid communication with ambient air for maintaining the interior pressure of the housing at ambient air pressure. The air passageway includes a check valve configured to preclude discharge of the first or second fluid from the housing.

One method of the present invention for separating fluids having similar densities but dissimilar viscosities includes the step of dispersing bubbles of a gas into the liquid mixture to produce a gas-entrained liquid mixture. The gas-entrained liquid mixture is introduced into the separation chamber, preferably by initially introducing the gas bubbles into the inlet duct. The gas is mixed with the liquid mixture in the mixing chamber.

The gas-entrained liquid mixture is spun in the separation chamber about the axis of rotation to force the first fluid and the gas to migrate radially inwardly in the separation chamber while the second liquid migrates radially outwardly in the separation chamber. At least a portion of the gas and the first liquid are permitted to exit the separation chamber by passing over the first weir, while at least a portion of the second liquid is permitted to exit the separation chamber by passing over the second weir. A portion of the gas introduced into the liquid mixture exits the separator through an air vent in fluid communication with the flow of the first liquid which passes over the first weir.

The objects and advantages of the present invention will become more fully apparent by examination of the following description of the preferred embodiments and the accompanying drawings.

BRIEF DESCRIPTION OF THE DRAWINGS

In order that the manner in which the above-recited and other advantages and objects of the invention are obtained may be understood, a more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF THE PREFERRED EMBODIMENTS

Figure 1:
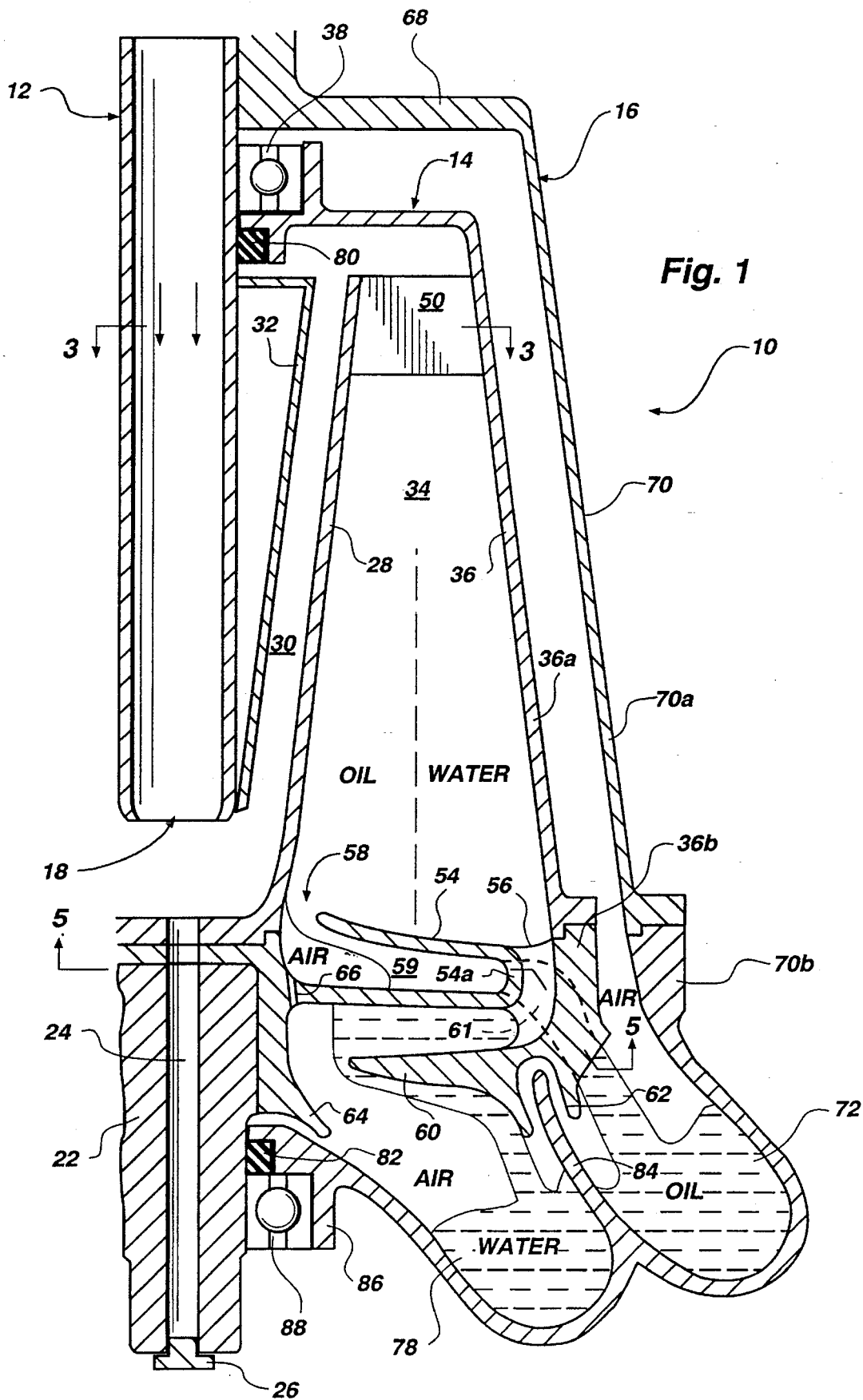
FIG. 1 is a partial elevational view in cross-section of an example of a single stage centrifugal separator according to the invention.

Reference is now made to the figures wherein like parts are referred to by like numerals throughout. With particular reference to FIG. 1, a single stage centrifugal separator 10 according to the invention separates a combined stream of two immiscible liquids of differing densities into its component parts. The invention will be described as separating a stream of oil mixed with water, though it will be understood that the invention efficiently separates other fluid combinations. The separator 10 comprises three principal components: a stationary shaft inlet port 12, a rotor 14 adapted for rotational movement around the inlet port 12, and a stationary housing shell 16 surrounding the rotor 14. The components comprise in construction a suitably rigid material such as steel or plastic; stainless steel being presently preferred.

The oil and water mixture enters the separator 10 through a mouth 18 of the stationary shaft 12. This inlet arrangement has the advantage of eliminating contact of the mixture with the air between the rotor 14 and the housing 16, while minimizing agitation and foaming which may hamper separation. Additionally, the separator 10 can be used in any orientation as long as the output structures are appropriately designed since the oil/water mixture does not enter the space between the rotor 14 and the housing 16, and thus can not interfere with transfer of the separated liquids from the rotor to the housing. Nevertheless, the described embodiment of the separator 10 is intended for use in a vertical position with the fluid combination downwardly traveling through the inlet shaft 12, as shown by the arrows in FIG. 1.

The inlet shaft 12 comprises a single hollow shaft in the single-stage version or a plurality of smaller shafts, such as a bundle of shafts or a concentric arrangement, which will be described later in conjunction with the two-stage embodiment of the invention.

The rotor 14 comprises a rotatable drive shaft 22, located coaxially to and beneath the inlet shaft 12, which is rotated by any suitable means such as a motor and accompanying drive train (not shown). The drive shaft 22 rotates the rotor at a speed determined to be suitable in light of weir structure, relative densities of the fluids being separated, size of the separator components, magnitude of desired centrifugal force, and other factors familiar to those skilled in the art. If desired, the drive shaft 22 may contain a drain channel 24, having a stopper or closure 26 secured therein by threading or other means, for convenient flushing and draindown of the separator 10 by running a suitable cleansing fluid through the inlet port 12, allowing the fluid to run through the separator, and draining the excess through the unstopped drain channel 24.

A center wall 28 rises from the drive shaft 22, creating a mixing chamber 30 where the input fluid is mixed through shearing between the moving center wall 28 of the rotor and the outer wall of the stationary inlet shaft 12. The mixing chamber 30 has a relatively small volume, thereby minimizing shear resistance and thus the power required to maintain the rotor at the desired speed. The volume of the mixing chamber optionally can be further decreased by mounting a frustoconical protrusion 32 on the stationary shaft 12 or by otherwise building up the volume displaced by the stationary shaft 12 or center wall 28. The mixing chamber may be optionally deleted where the mixing function is not needed as will be further described with reference to FIG. 2. A primary purpose of the mixing chamber is for addition of a conditioning material, such as a solvent for reducing viscosity or for solvent extraction.

The fluid mixture flows with the aid of externally applied pressure and centrifugal force from the mixing chamber, or optionally from the inlet shaft, into the separation chamber 34, formed by the center wall 28 and the coaxial outer wall 36, where the component fluids are separated. The outer wall 36 slopes oppositely from the center wall 28, causing the separated oil and water to move downwardly along the inner and outer walls, respectively, toward the separator's weir structures. The top of the outer wall 36 meets the stationary shaft 12 in annular engagement. At that location, bearings 38 are mounted between the wall 36 and the shaft 12 to enable the rotor 14 to rotate relative to the stationary shaft 12. Shaft seal 80 is provided to protect the bearing from contact with the internal fluids.

Figure 2:
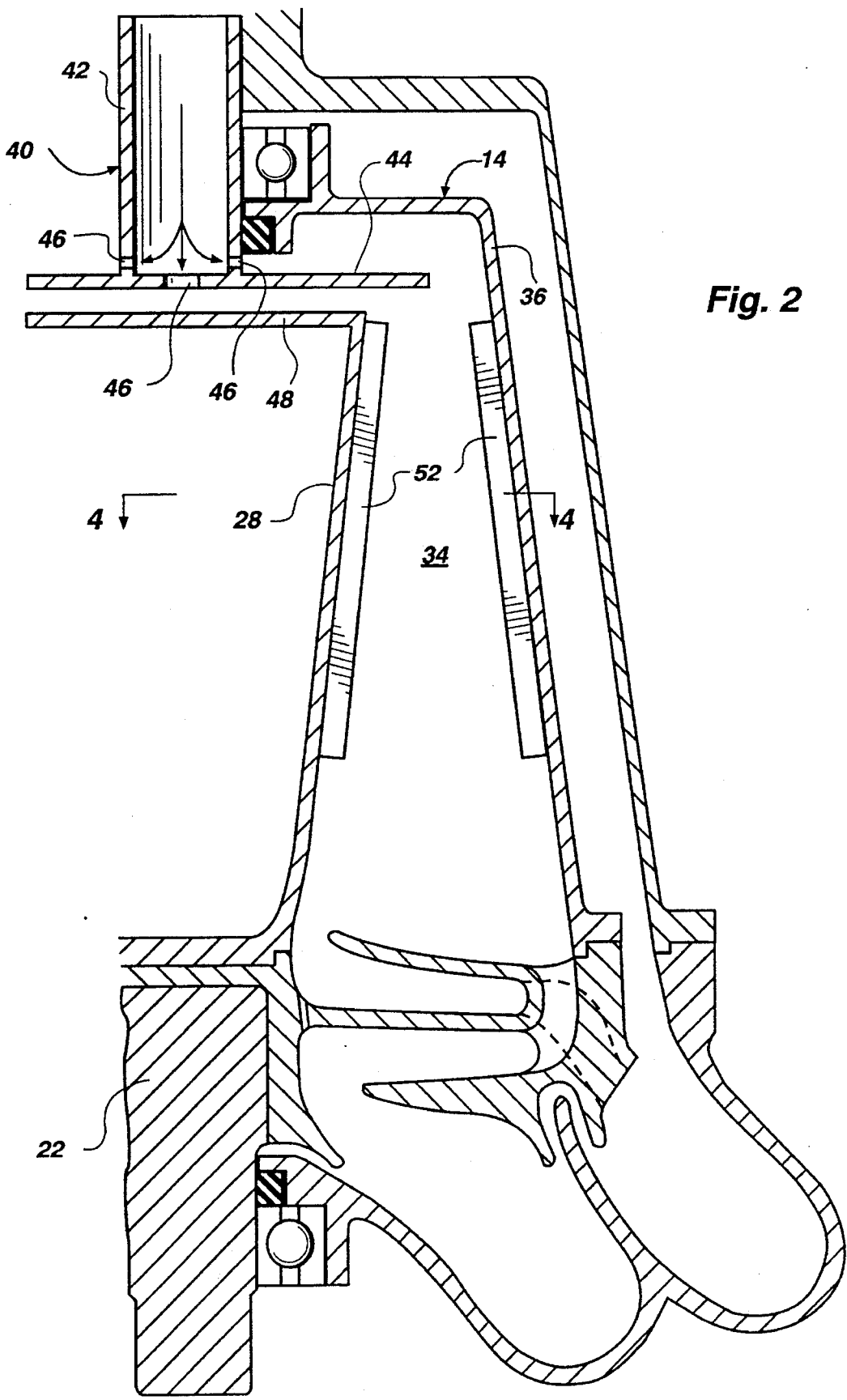
FIG. 2 is a partial elevational view in cross-section of the separator of FIG. 1 showing an alternative inlet port and vanes in the separation chamber.

FIG. 2 illustrates an alternative inlet port 40 comprising a stationary shaft 42 which differs from the stationary shaft 12 in that it is shorter and capped by a disc 44 which extends out from the shaft 42 as a flange. The input fluid enters the rotor 14 through holes 46 near the bottom of the shaft 42 and in the disc 44. The center portion of the rotor 14 inside the center wall 28 and below the inlet port 40 is sealed off by a top wall 48, whereby the input fluid is shear mixed in the region between the disc 44 and the top wall 48 and the region between the disc 44 and the top of the outer wall 36 before entering the separation chamber 34. The inlet port 40 allows for complete flushing and draindown of the separator without a drain channel in the drive shaft 22, since no liquid collects in the region inside the center wall 28. Optionally, mixing of the input flow may be eliminated from the design of FIG. 2 by deleting the shear disk 44.

Referring again to FIG. 1, the oil and water of the input fluid combination separate in the separation chamber 34 owing to the lighter density of oil relative to water. In the field of the centrifugal force created by the rotation of the rotor 14, the oil "rises" radially inwardly toward the center wall 28 while the water "sinks" radially outwardly toward the outer wall 36.

Figure 3:
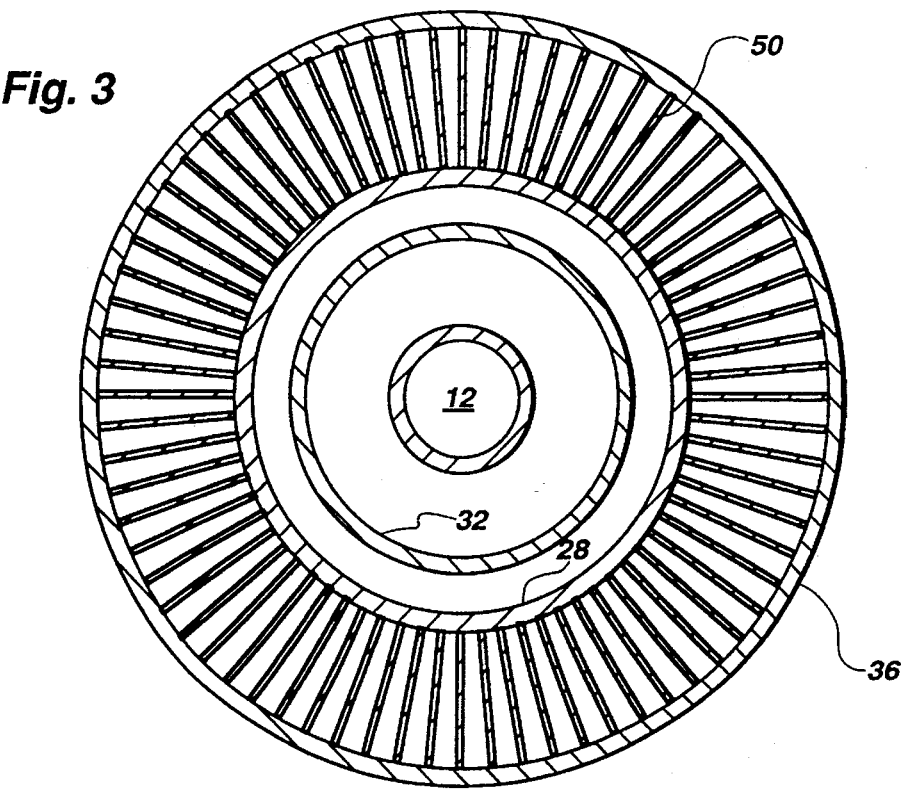
FIG. 3 is a cross-sectional view taken along line 3—3 of FIG. 1.

If desired, an optional sieve 50 illustrated in FIGS. 1 and 3 can be mounted between the center wall 28 and the outer wall 36 in the upper portion of the separation chamber 34 to aid the separation. The sieve 50 comprises a plurality of closely spaced, radially oriented plates parallel to the axis of rotation in the preferred embodiment. For oil/water separation, the plates are coated with or formed from a lipophilic material such as polypropylene. While the fluid mixture travels through the sieve 50, finely dispersed or emulsified oil, which may be difficult to separate simply through centrifugal force, condenses on the surface of the plates and is thereby collected and separated from the water. Sieves used in gravitation separators have not been effective since they must be large with widely spaced plates in order to operate in a 1-g field. When used in the separator 10, however, the sieve can be small with closely spaced plates due to the higher magnitude of the g field. These modifications greatly improve separation effectiveness.

Figure 4:
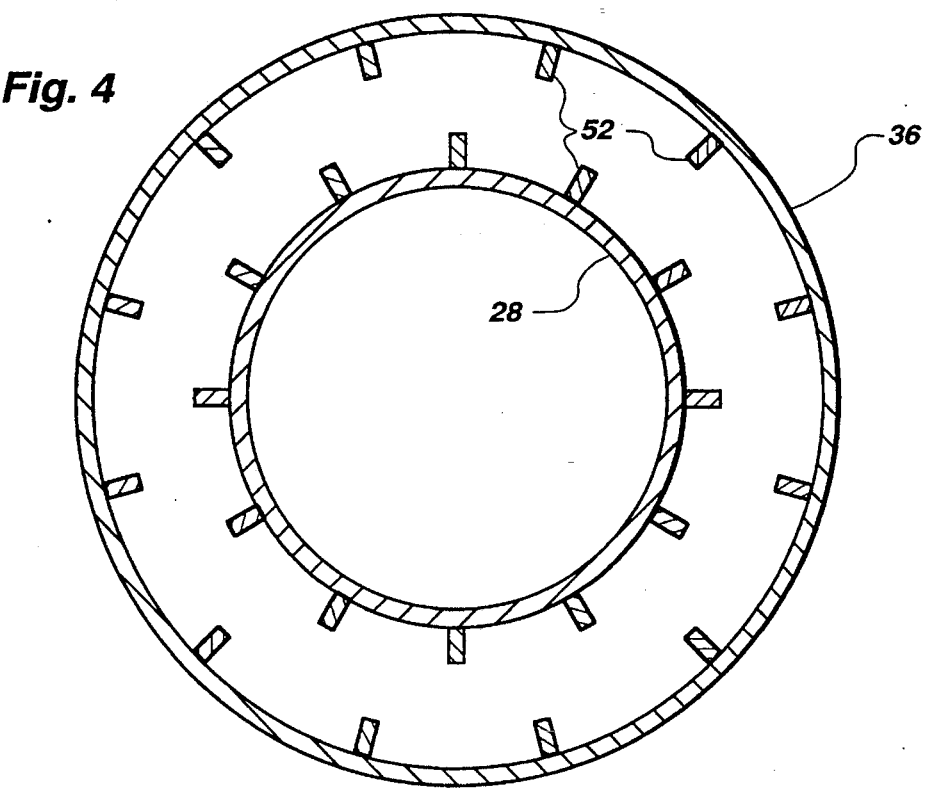
FIG. 4 is a cross-sectional view taken along line 4—4 of FIG. 2.

The sieve 50 also redirects and aligns the flow of incoming fluid. It has been found effective to guide the fluid in the axial direction to avoid shearing against the center and outer walls 28 and 36. Vanes or ribs 52, illustrated in FIGS. 2 and 4, may alternatively be mounted on the walls of the separation chamber to accomplish the same purpose. The vanes 52 may partially or completely traverse the separation chamber 34 in the radial direction.

Figure 5:
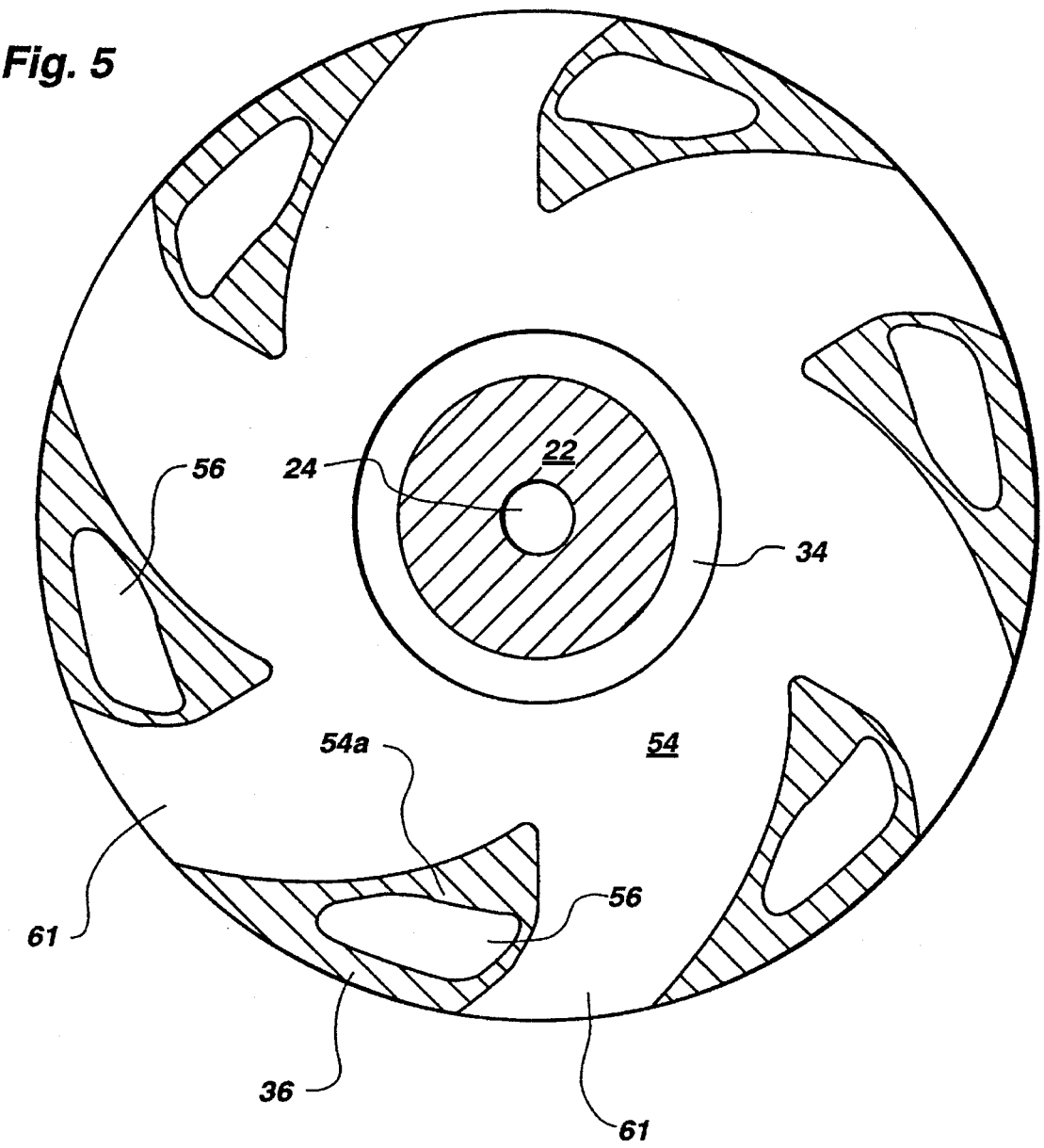
FIG. 5 is a cross-sectional view taken along line 5—5 of FIG. 1.

As illustrated in FIGS. 1 and 5, the separation chamber 34 contains a weir 54 at its bottom for direction of the separated oil and water. The weir 54 comprises an annular baffle plate attached to and extending from the drive shaft 22 toward the outer wall 36. The plate bends back upon itself to extend toward the center wall 28 before reaching the wall 36, at 54a, creating a segmented annular passage 56 between the bend 54a and the outer wall 36 for the passage of water from the separation chamber 34. The weir plate ends a short distance from the center wall 28, creating an annular passage 58 between the edge of the weir 54 and the center wall 28 for the collection of oil from the separation chamber 34. The bent weir plate creates an intermediate oil collection chamber 59 under the top plate of the weir 54. The oil collected in the intermediate chamber 59 is shunted through a plurality of channels 61 formed through the bend 54a in the weir 54, the water passage 56, and the outer wall 36.

The outer wall 36 bends beneath and parallels the curvature of the weir 54 to shunt the collected water back toward the drive shaft 22. The outer wall 36 ends before contacting the drive shaft 22, thereby forming a second weir 60. An annular groove 62 is formed in the side of the outer wall 36 opposite the water passage 56 to receive wall 84 which divides the collection chambers 78 and 72 that respectively conduct outflows of water and oil. As illustrated in FIG. 1, the outer wall 36 is formed of an upper wall piece 36a and a lower wall piece 36b secured to each other by screws or other means. This component configuration is solely for convenience of construction. The wall 36 may if desired comprise a unitary piece without affecting separation. A sloped outcropping 64 extending from the drive shaft 22 guides water away from the shaft seal 82.

The outflow of separated fluids around the weir 54 is controlled so that a stationary oil/water interface is maintained between the outlets in the passages 56 and 58 during rotation. The interface must not approach either outlet too closely or mixed fluid may be discharged. As in prior art apparatus, air must be present adjacent the edges of each of the weirs 54 and 60 since separated liquid outflow rates are determined by free-surface flow over the weirs 54 and 60. In the present invention, however, the air/liquid interface at the center of the rotor 14 is largely eliminated by the radially outward slope of the center wall 28, which causes most of the center wall to be radially more outward than the edge of the weir 54, confining the necessary air/oil interface to a narrow pocket region adjacent the edge of the weir 54 where the center wall is sufficiently inward relative to the weir edge to establish a free liquid surface. Thus, the rotor 14 separates substantially all the input liquid without interaction with air and consequent foaming and interference with separation. A similar pocket of air is disposed near the edge of the weir 60. Air ducts 66 formed through the bottom plate of the weir 54 equalize pressure between the two pockets of air and remove excess gases therefrom which form bubbles of air mixed with the input fluid which "rise" to the center wall and migrate along it until they join with the pocket of air near the edge of the weir 54.

The sloping of the center and outer walls 28 and 36 allows the weirs 54 and 60 to be large in relation to overall rotor size, improving flow rate and separation efficiency. The formula for the position of the liquid/liquid (oil/water) interface between the separated liquids in the separation chamber 34 is $$r_b = \sqrt{\frac{\rho_w r_w^2 - \rho_o r_o^2}{\rho_w - \rho_o}}, \quad (1)$$

where $r_b$ is the radial distance of the liquid/liquid interface from the axis of rotation, $r_w$ is the radial distance of the heavier liquid surface over the second weir edge, $r_o$ is the radial distance of the lighter liquid surface over the first weir edge, $\rho_w$ is the density of the heavier liquid, and $\rho_o$ is the density of the lighter liquid.

The liquid/liquid interface in the separation chamber 34 must lie between the edge of the weir 54 and the bent portion 54a of the weir to avoid discharge of mixed fluid. This is expressed in mathematical terms as:

$$r_1 < r_b < r_p, \quad (2)$$

where $r_p$ is the radial distance of the bent portion 54a of the first weir, and $r_1$ is the radial distance of the edge of the first weir.

Thus, as the distance between the edge of the first weir 54 and the bent portion 54a of the weir increases, the range of possible positions of the liquid interface increases and thus the range of liquid densities that can be separated by the weirs. These relationships can be used to design a weir structure that performs optimally for any particular application.

It has been found that the optimum weir construction for a separator designed to separate common crude oils from water satisfies the following relationship:

$$r_w = .937 r_o + .05 r_p + .008 \frac{r_p^2}{r_o}. \quad (3)$$

The depth of the liquid over the edge of a weir, indirectly represented in the equations by $r_w$ and $r_o$, depends on the relative proportions of the component fluids in the input mixture, viscosity, input flow rate, and speed of the rotor 14. The most effective designs will maintain a shallow flow over the weir edges. Air pressure at the weir edges must be equal in order for the above equations to be valid, accomplished by the air ducts 66 or other equivalent means.

The housing 16 collects the separated liquids from the rotor 14. The housing 16 is a single shaped wall which is formed around the rotor 14 and which completely encloses it. The annular top 68 of the housing, secured to the input shaft 12 by suitable means, extends out horizontally past the rotor 14. A sidewall 70 meets the edge of the top 68 and descends parallel to the outer wall 36 of the rotor. In the described embodiment the sidewall 70 is formed from two pieces 70a and 70b for convenience of construction, which are joined near the bottom of the sidewall 70 by screws or other suitable means in a fashion similar to the outer wall 36 of the rotor.

An oil collection chamber 72 is formed at the bottom of the sidewall 70 to receive the separated oil from the oil channels 61 through the wall 36. A water collection chamber 78 is formed adjacent to and radially inward from the oil collection chamber 72. An intermediate wall 84 is formed between the oil and water collection chambers 72 and 78 to keep the separated fluids apart. The end of the wall 84 fits into the annular groove 62 of the rotor to effectively prevent cross-contamination of the separated fluids. The collection chambers 72 and 78 are provided with attachments (not shown) for connection of pipes or hoses that remove the separated fluids.

The end of the radially inward wall 86 of the water collection chamber 78 fits against the drive shaft 22 underneath the outcropping 64 in annular engagement. Bearings 88 are mounted between the end of the wall 86 and the drive shaft 22 to allow the rotor 14 to rotate within the housing 16. A seal 82 is provided to protect the bearing from the internal fluids.

The separator 10 can be flushed and cleaned by operating it with a cleaning slurry containing water, pentane, and a suitable detergent, or another similar slurry formulation. The weirs and flow channels of the separator are sloped so that no liquid is trapped inside when the separator and the input liquid flow are stopped.

The separator 10 can be made in various sizes, all of which are functionally equivalent except that larger sizes will have a lower angular velocity in equivalent applications. The range of liquids that can be separated remains the same.

Figure 6:
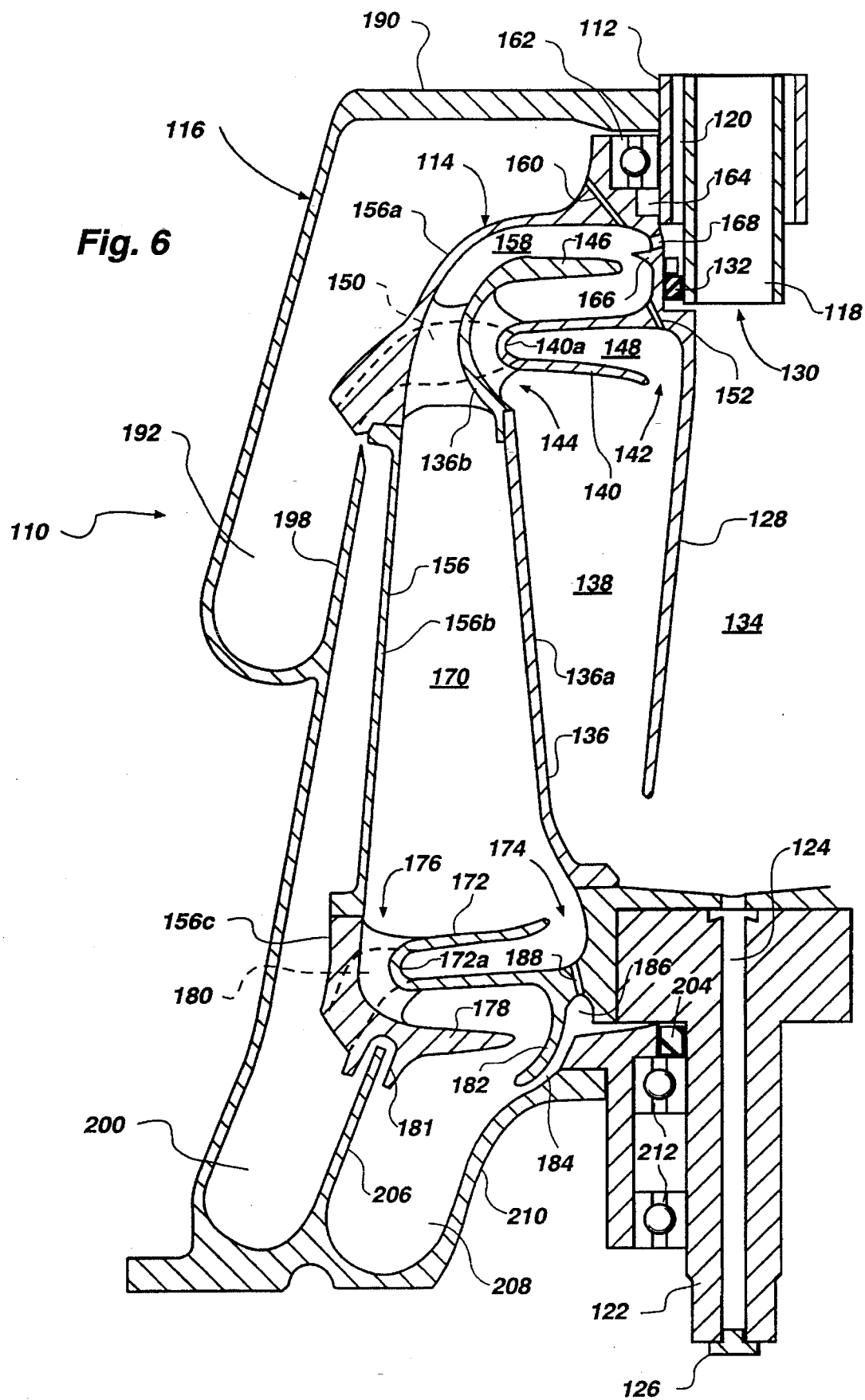
FIG. 6 is an elevational view in cross-section of an example of a two stage centrifugal separator according to the invention.

FIG. 6 shows a two-stage separator 110 according to the invention. The separator 110 separates immiscible liquids containing dissolved contaminants or immiscible liquids that are resistant to separation, such as those in an emulsion. The one-stage separator 10 is not able to separate out dissolved contaminants in mixed fluids in a single operation. The separator 10 is able to separate fluids resistant to separation to a degree, particularly with the help of the sieve 50, but does so inefficiently. This is the case especially with very stable, finely dispersed colloidal suspensions and solutions.

As is known in the art, a separator such as the separator 10 can be used in two stages to separate immiscible liquids and dissolved contaminants. The immiscible liquids first are separated through the process described above, and the separated liquid containing the contaminants is mixed with a solvent that has a higher affinity for the contaminants, by which means the solvent breaks down the solution or emulsion and absorbs the dispersed contaminant into itself. The solvent and liquid, which preferably are immiscible, are then separated by putting them through the separator 10 a second time. The solvent can conveniently be mixed with the liquid containing the contaminant by putting them into the separator 10 in combination and allowing them to mix through the shear action in the mixing chamber 30 of separator 10 (FIG. 1). If it is required that the liquid be of very high purity, the solvent purification process can be repeated until the desired level of purity is obtained.

Solvent extraction separation is desirable for mixtures such as commercial motor oil mixed with water, since commercial motor oils contain detergents that cause foaming and emulsions. A further example is a mixture of commercial gasoline with water: gasoline formulations contain carcinogenic substances as additives, such as benzene, toluene, ethyl benzene, xylenes, and naphthalene. The additives are slightly soluble in water, allowing a few parts per thousand to exist in solution.

The two-stage separator 110 carries out the required stages of initial separation, solvent extraction, and final separation in a single operation. The separator 110 will be described as separating motor oil mixed in water with the oil containing benzene contaminants which slightly dissolve in water. The solvent used preferably is hexane or, alternatively, pentane. It will be understood that various other mixtures and solvents can be used. The separator 110 is similar in construction to the separator 10 in many aspects, except that, among other differences, it contains two separation chambers with the high-density liquid output of the first chamber continuing into the second, radially more outward, chamber after being injected with a solvent.

The separator 110 comprises a stationary input shaft 112, a rotor 114, and a housing shell 116. The input shaft 112 comprises two coaxial shafts, an inner shaft 118 through which the oil/water mixture enters the separator, and an outer shaft 120 through which the hexane solvent enters. The rotor 114 is driven by a rotatable drive shaft 122 under the power of a motor or other means (not shown). A drain channel 124 having a stopper 126 is provided in the drive shaft 122 for complete flushing and draindown of the separator 110. The center wall 128 of the rotor 114 extends downwardly from its point of origin at the side of the mouth 130 of the inner input shaft 118, and slopes radially outwardly before ending near the top of the drive shaft 122. The center wall 128 is sealed from the outer input shaft 120 by an annular seal 132, preventing solvent from entering the chamber 134 formed by the center wall 128.

An intermediate wall 136 attaches to the top of the rotatable shaft 122 and extends up and radially outward, creating a separation chamber 138 between the intermediate wall 136 and the center wall 128. The input oil/water mixture enters the chamber 134 from the inner shaft 118 and is urged downwardly by external pressure and centrifugal force during rotation. The mixture then flows around the edge of the center wall 128 into the separation chamber 138, wherein the separated components are urged upwardly by the radially outward slope of the intermediate wall 136 (for the water) and the radially inward slope of the center wall 128 (for the oil) toward a weir 140 disposed at the top of the separation chamber 138.

The weir 140 is similar in construction to the weir 54 in the single stage separator 10. The weir 140 comprises a baffle plate which originates from the center wall 128, extends radially outward, and bends back upon itself, creating an annular oil passage 142 between the edge of the weir 140 and the center wall 128. A water passage 144 is formed between the bent portion 140a of the weir and the intermediate wall 136, the latter curving around the weir 140 to continue the passage 144 and form a weir 146. For convenience of construction, the intermediate wall comprises two portions, a lower portion 136a and an upper portion 136b which are joined by welding or other suitable means near the bent portion 140a of the weir 140. An intermediate oil chamber 148 is formed in the interior of the weir 140, and an oil channel 150 is formed through the bent portion 140a of the weir, the water passage 144, and the intermediate wall 136.

The weirs in the two-stage separator 110 are preferably made in accordance with the optimal weir construction previously described.

The separation chamber 138 separates the oil/water mixture, after which the separated oil is directed through the passage 142, into the chamber 148, and through the channel 150. The water is directed into the passage 144 and over the edge of the weir 146. The air pockets over the weirs 140 and 146 communicate through air ducts 152, thereby equalizing the pressure between the air pockets over the weirs 140 and 146.

An outer wall 156 is provided over the intermediate wall 136 to form an outer water passage 158 over the weir 146, and has air ducts 160 formed therethrough to allow the air pocket over the weir 146 to communicate with the housing space. The end of the outer wall 156 meets the input shaft 112 in annular engagement. Bearings 162 are mounted between the wall 156 and the shaft 112 to allow rotation of the rotor 114 around the input shaft 112. A seal 164 also is provided between the outer wall and the inlet shaft. A lip 166 is formed on the end of the center wall 128 at the point at which it meets the outer wall 156 in order to guide the water around the weir 146 and to direct solvent into the water stream.

A solvent channel 168 is formed at the juncture of the outer wall 156 and the center wall 128 between the outer inlet shaft 120 and the outer water passage 158, supplying hexane solvent into the water stream just above the weir 146. The solvent and water mix in the outer passage 158 to remove emulsions and dissolved contaminants. The solvent channel 168 is directed so that the solvent is introduced into the high-velocity water stream flowing over the weir 146 to facilitate mixing. The weir 146 is formed with an appropriate slope and contour to prevent the water flow from separating from the face of the weir, which facilitates mixing and mitigates weir erosion. All weirs in the various illustrations are intended to illustrate similar slope and contour for this same purpose.

It can be seen that the oil channel 150 continues from the intermediate wall 136 through the outer water passage 158 and outer wall 156 to a collection chamber in the housing

116.

The outer water passage 158 continues down between the intermediate wall 136 and outer wall 156 until it enters a second separation chamber 170 formed between the walls 136 and 156. The separation chamber 170 separates the water from the solvent, which contains the extracted contaminants. The outer wall 156 slopes radially outward to urge the cleaned and separated water down to a weir 172 formed at the bottom of the separation chamber 170 which directs the separated liquids out of the separation chamber 170. Hexane has lesser density than water, so the hexane "rises" radially inward toward and is urged downward by the radially inwardly-sloped intermediate wall 136 while the water "sinks" radially outward against the outer wall 156.

The weir 172 is formed from a baffle plate originating on the drive shaft 122, extending radially outward, bending back on itself, and ending before reaching the drive shaft 122 forming an annular solvent passage 174. A water passage 176 is formed between the bent portion 172a of the weir and the outer wall 156, which curves under the weir 172 and ends to form a weir 178. A solvent channel 180 is formed through the bent portion 172a, passage 176, and outer wall 156 to carry the separated solvent into the housing 116.

The outer wall 156 is formed from three secured pieces 156a, 156b, and 156c for convenience of construction. An annular groove 181 is formed on the outer side of the lower section 156c.

An outcropping 182 extends from the bottom of the weir 172 around the edge of the weir 178 to guide the water into the housing 116. A small air channel 184 underneath the outcropping 182 leads from the housing air space to a cavity 186. Air ducts 188 lead from the cavity 186 to the air pocket at the edge of the weir 172 to equalize the pressure therein.

The housing 116 comprises a top wall 190 secured in annular attachment to the inlet shaft 112 by welding or other means. The top wall 190 extends horizontally outward over the outer wall 156 of the rotor 114, and a side wall descends from it to form an oil collection chamber 192 below the oil channel 150. The chamber 192 receives and collects the separated oil. An attachment (not shown) to the chamber 192 affords connection to a pipe or hose for discharge of the separated oil.

The radially inward wall 198 of the oil collection chamber 192 descends substantially parallel to the outer wall 156 of the rotor, and forms a solvent collection chamber 200 below the solvent channel 180 for the collection of solvent and accompanying contaminants. An attachment (not shown) to the solvent collection chamber 200 affords connection to a pipe or hose for discharge of the solvent. The discharged solvent may be recycled and reused in the separator 110, if desired.

The inner wall 206 of the solvent collection chamber 200 ends inside the annular groove 181 to effectively prevent cross-contamination with purified water in chamber 208. The wall 206 also serves as the outer wall of the water collection chamber 208 formed beneath the weir 178 for collection of water which has been separated from the oil and additionally purified of benzene or other impurities. In other words, the purified water contains neither immiscibles nor soluble organics. An attachment (not shown) to the water collection chamber is provided for connection of a pipe or hose for removal of the purified water.

The inner wall 210 of the water collection chamber ends in annular engagement with the drive shaft 122. Bearings 212 are mounted between the wall 210 and the drive shaft 122 to allow the drive shaft to rotate within the housing. An annular seal 204 is placed adjacent to bearings 212 to protect them from the internal fluids.

One run through the separator 110 is sufficient to separate out immiscibles and soluble organics from the water. If desired, the operation can be repeated in order to achieve a higher level of purity.

It will be understood that many different combinations of liquids can be separated by the separator 110. It will also be understood that the different auxiliary structures described with regard to the separator 10 such as the sieve 50 and vanes 52 can also be used beneficially in the separator 110.

Figure 7:
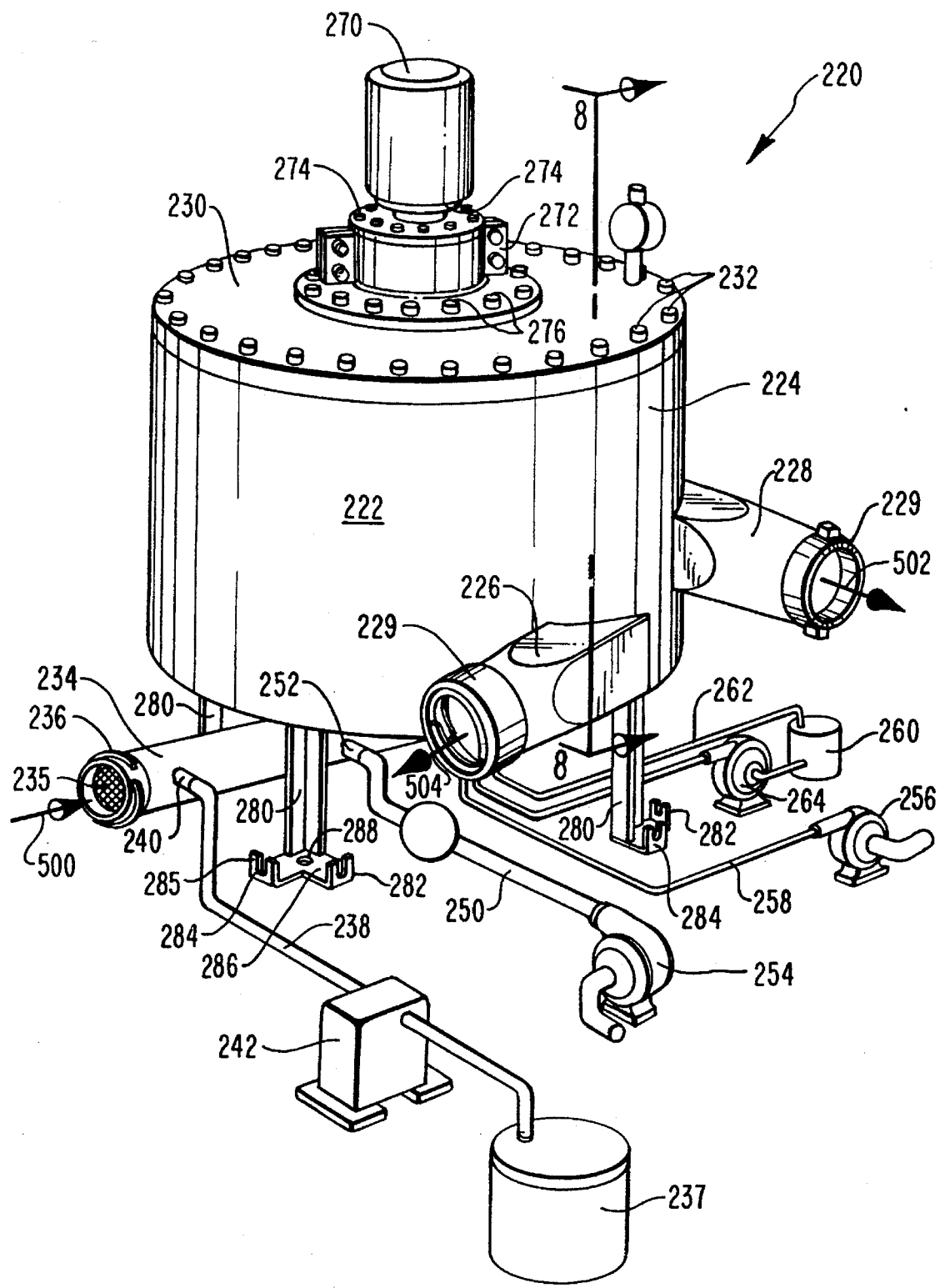
FIG. 7 is a perspective view of a presently preferred embodiment of the present invention.

A further alternative embodiment of the present invention for units of large size is illustrated in FIG. 7. This embodiment illustrates by specific example how the elements and features of the basic construction of the embodiment of FIG. 1 may be varied, in particular for ease of manufacture, and further illustrates additional aspects of the invention. In FIG. 7, the separator is generally designated at 220. This embodiment of the invention is designed to process approximately 16 liters of fluid per second, but could be made in a variety of sizes. One of skill in the art will appreciate that this embodiment may also be successfully utilized to separate fluids over a wide range of flow rates. As with previously described embodiments, this embodiment will be described with reference to the separation of oil and water, it being understood that the separator may be utilized to separate a variety of fluids having differing densities or viscosities.

The separator 220 includes a centrifuge 222 in which the fluid separation occurs. The centrifuge 222 may be made of a variety of materials including metals, such as stainless steel or aluminum. It is presently preferred to manufacture this centrifuge of stainless steel. Portions of the centrifuge which are not made of stainless steel are specifically pointed out below.

The centrifuge 222 includes a housing 224 in which are configured an oil exit duct 226 and a water exit duct 228. The oil exit duct 226 and the water exit duct 228 are aligned tangentially to the housing 224 to facilitate the removal of separated fluids from the centrifuge. The mouth of the oil exit duct 226 and the water exit duct 228 are each configured with a cam-lock coupling 229 by which the ducts may be attached to hoses or pipes to channel the separated water and oil exiting the centrifuge.

The housing 224 is preferably configured with a top 230 which is attached to the remainder of the housing with a plurality of bolts 232. The top 230 may therefore be easily removed to facilitate manufacture and maintenance of the centrifuge.

An inlet duct 234 having a receiving end and a discharge end is attached to the bottom of the centrifuge 222. It is through the inlet duct 234 that fluids may be introduced into the centrifuge. Means for introducing a fluid into the inlet duct such as a pump (not shown) may also be provided.

The receiving end of the inlet duct 234 is configured with a screen 235 which prevents overly large debris from entering the centrifuge 222. It is presently preferred to utilize a screen which will permit the passage of particles having an effective diameter less than about 0.75 centimeters. The receiving end of the inlet duct 234 is also configured with a cam-lock coupling 236 by which the inlet duct may be quickly and easily connected to a supply line.

When using the separator 220 to effect solvent extraction, as further explained below, a supply of solvent 237 may be introduced into the inlet duct 234 by affixing a solvent supply line 238 to an injector 240 tapped into the inlet duct 234. The solvent 237 is pumped into the inlet duct 234 by pump 242. Solvent 237 may be replaced by other fluid additives, such as emulsion breakers, as the particular application may require.

The separator 220 may also include means for introducing gas into the separator in accordance with the teachings of the air entrainment method of the present invention. Such means may include a gas supply line 250 attached for injection of gas into the inlet duct 234 through an injector 252. A small pump 254 may be utilized to pump the gas into the inlet duct 234. For most air entrainment applications, a pump 254 having a capacity of 2.4 liters per second with a pressure of 2,400 pascal is sufficient.

With continued reference to FIG. 7, the illustrated embodiment further includes means for introducing a second flow of gas into the separator for maintaining the appropriate pressure balance in the weir structure of the centrifuge 222, as is explained below. Accordingly, a gas pump 256 is attached to a gas supply line 258 which is connected into a gas introduction passageway (not shown in FIG. 7) at the bottom of the centrifuge 222. Gas pump 256 is preferably a 1,000 pascal pump with an ambient air intake.

A supply of lubrication 260 is provided for bearings within the centrifuge 222. The lubrication 260 is pumped through a circulation line 262 by a lubrication pump 264.

It is presently preferred that the various hoses and lines feeding the centrifuge 222, such as solvent supply line 238, gas supply line 250 and gas supply line 258, be configured within the housing 224 of the centrifuge such that they extend out the side of the centrifuge. This would enable a fork lift or other machine to be employed to lift the centrifuge from the bottom without damaging these lines.

The separator of the present invention also includes a motor 270 mounted on top of the centrifuge 222. Motor 270 may include any commercially available motor such as the model M7F hydraulic motor marketed by Denison Hagglunds of Delaware, Ohio. The motor 270 is attached to the centrifuge 222 for easy removal by mounting it to a collar 272 with bolts 274. The collar 272 is attached to the top 230 of the housing 224 by bolts 276.

Although a centrifuge built according to the teachings of the present invention will operate in any orientation, it is contemplated that it will generally be operated with the centrifuge oriented as illustrated in FIG. 7. Consequently, the centrifuge 222 is provided with four legs 280 by which the centrifuge may be rigidly mounted for use. Each leg 280 includes a mounting foot 282 which is configured with a pair of chain anchors 284 which may be used to secure the legs. Each chain anchor 284 includes two toes 285 spaced sufficiently to receive a link of a conventional chain. The centrifuge 222 may thus be secured by lashing a chain over an anchor, by securing a link between the toes 285 of an anchor or by looping an end link of a chain over one of the toes of an anchor. The mounting foot 282 further includes a base 286 in which a mounting hole 288 is configured. Thus, the centrifuge 222 may be rigidly mounted to a structure, such as a shipping container, or a factory or ship floor, merely by bolting the mounting feet 282 to the structure.

Figure 8:
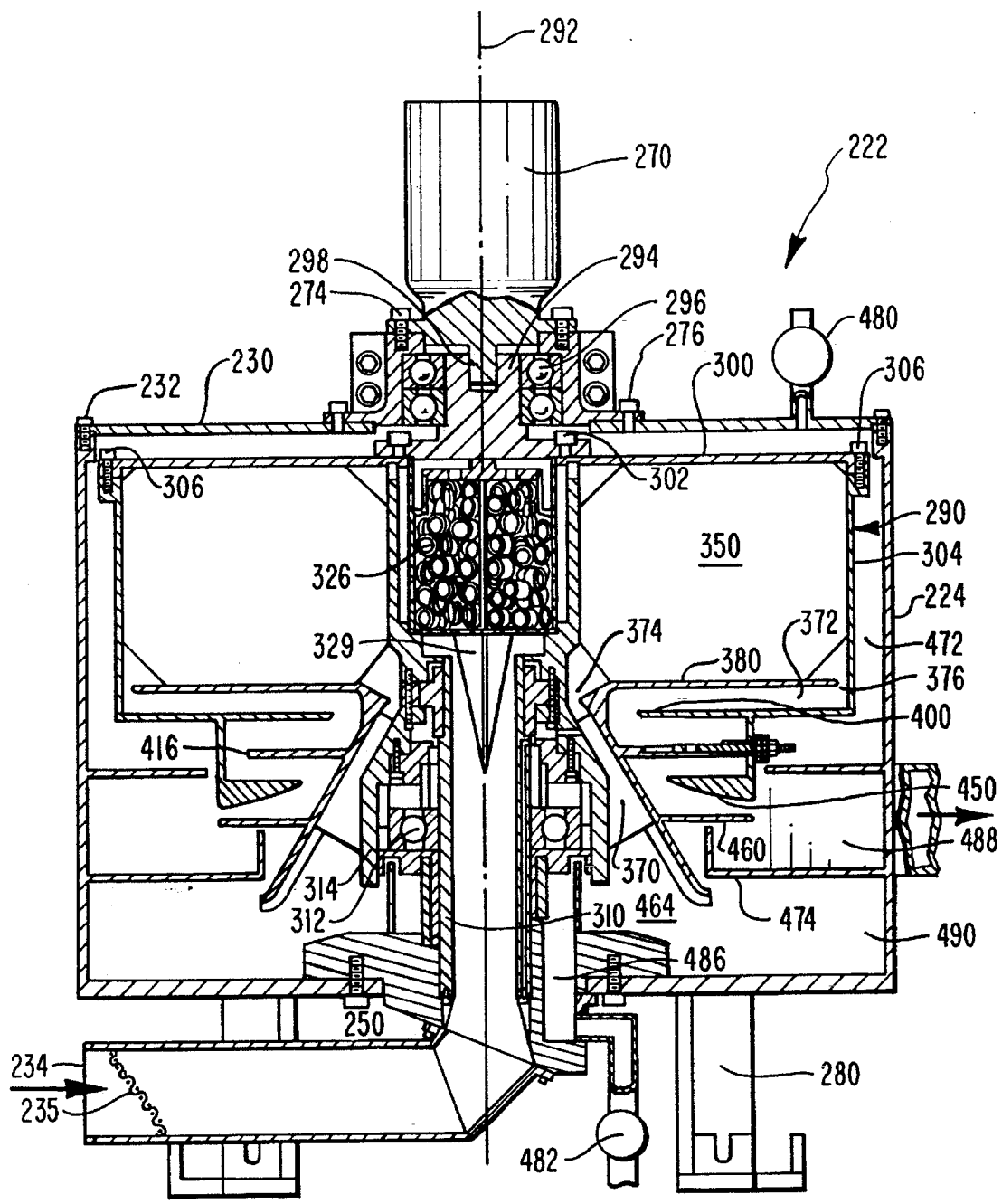
FIG. 8 is a cross-sectional view taken along line 8—8 of FIG. 7.
Figure 9:
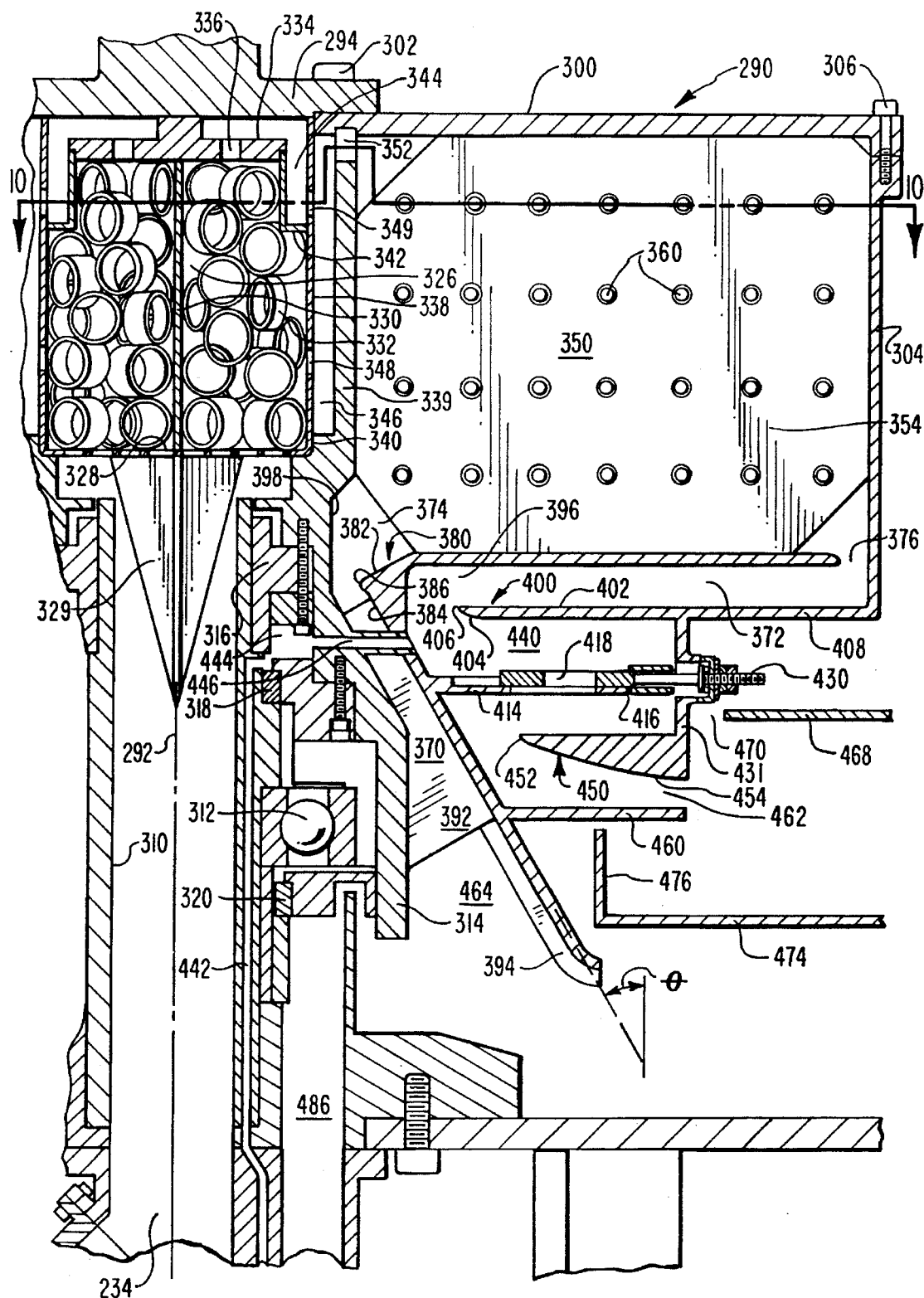
FIG. 9 is an enlarged view of a portion of the centrifugal separator illustrated in FIG. 8.

As illustrated in FIGS. 8 and 9, the centrifuge 222 includes a rotor 290. The rotor 290 is mounted for rotation about an axis of rotation 292. The rotor acts as one integral piece and is mounted for rotation about the axis of rotation 292. The rotor includes a circular upper shaft 294 affixed for rotation by a pair of sealed upper bearings 296. The upper shaft 294 is configured to mate with the drive shaft 298 of the motor 270 by which the rotor is driven.

The rotor also includes a top wall 300 which is mounted to the upper shaft 294 by a plurality of bolts 302. The top wall 300 is mounted to an outer wall 304 with bolts 306, thereby enabling the top of the rotor to be removed for easy assembly, maintenance and cleaning.

Within the centrifuge 222, the inlet duct 234 is defined by a cylindrical shaft 310 positioned along the axis of rotation 292. In this embodiment, the shaft 310 has an inside diameter of approximately seven centimeters. The rotor 290 is further mounted for rotation about the shaft 310 by positioning a lower bearing 312 between the shaft 310 and a hub 314 of the rotor 290. In order to accommodate the high loads to which the bearings 296 and 312 are subjected, it is preferred to utilize an antifriction bearing, such as the model 317 SZZ, made by SKF USA, Inc. of Jamestown, N.Y., for upper bearings 296 and an angular contact bearing, such as the model 320 RDM also made by SKF USA, Inc. for lower bearing 312.

The hub 314 of the rotor 290 is rotatably connected to and sealed against the shaft 310 by a cylindrical upper seal 316. A middle seal 318 and a lower seal 320 are also provided between the rotor 290 and the shaft 310. In this embodiment, upper seal 316, middle seal 318 and lower seal 320 are preferably carbon-ceramic rotary shaft seals, or their equivalent. Conventional elastomeric seals may be suitable for small separators.

As best illustrated in FIG. 9, the inlet duct 234 includes a mixing chamber 326. The mixing chamber includes a perforated floor 328 which will readily permit the passage of fluids and debris. It is presently preferred that the perforations in the floor 328 be generally circular with an approximate one centimeter diameter.

The interior of the mixing chamber 326 is preferably partitioned into four cavities by two radial partitions 330. The partitions 330 are positioned at right angles to each other and extend across the entire diameter of the mixing chamber 326. The mixing chamber also includes a fluid accelerator which, along with the partitions 330, assists the fluids entering the mixing chamber to quickly gain the angular velocity of the mixing chamber. The fluid accelerator comprises a plurality of lanceolate plates 329 which extend to a common point within the inlet duct 234. In this preferred embodiment, four plates 329 are employed.

The mixing chamber is configured with flow disrupting elements configured to induce turbulent flow of fluid through the mixing chamber. In this embodiment, the flow disrupting elements comprise rings 332. However, one of skill in the art will appreciate that a variety of elements may be utilized to induce turbulent flow, such as fibers, rods or other elements having a low packing fraction.

It is presently preferred that the rings 332 be made of a lipophilic material, such as polyethylene, and be approximately configured with a six millimeter length, a 25 millimeter diameter and a two millimeter wall thickness. The rings 332 are tightly packed within each cavity of the mixing chamber 326. The rings 332 are randomly positioned to maximize turbulence in the flow of fluid through the mixing chamber.

With continued reference to FIG. 9, the mixing chamber 326 includes a ceiling 334 spaced below the upper shaft 294. The ceiling 334 is configured with a plurality of openings 336 through which fluid may exit the mixing chamber into the space between the ceiling 334 and the upper shaft 294.

The mixing chamber additionally includes an outer wall 338 which seats at its lower end into a seat 340 configured in an inner wall 339 of the rotor 290. The upper portion of the mixing chamber 326 is stepped in at 342 to provide an annular passage 344. The outer wall 338 continues upwardly beyond the stepped-in portion 342 to seat against the upper shaft 294. The mixing chamber 326 is thus maintained concentric with the axis of rotation 292 by the inner edge of the top wall 300 of the rotor 290 and the seat 340, which are spaced radially inwardly of the inner surface of the surrounding portion of inner wall 339. An annular cavity 346 is thus defined between the outer wall 338 of the mixing chamber and the inner wall 339 of the rotor 290. The outer wall 338 of the mixing chamber includes lower openings 348 below the stepped-in portion 342 and upper openings 349 above the stepped-in portion 342.

Figure 10:
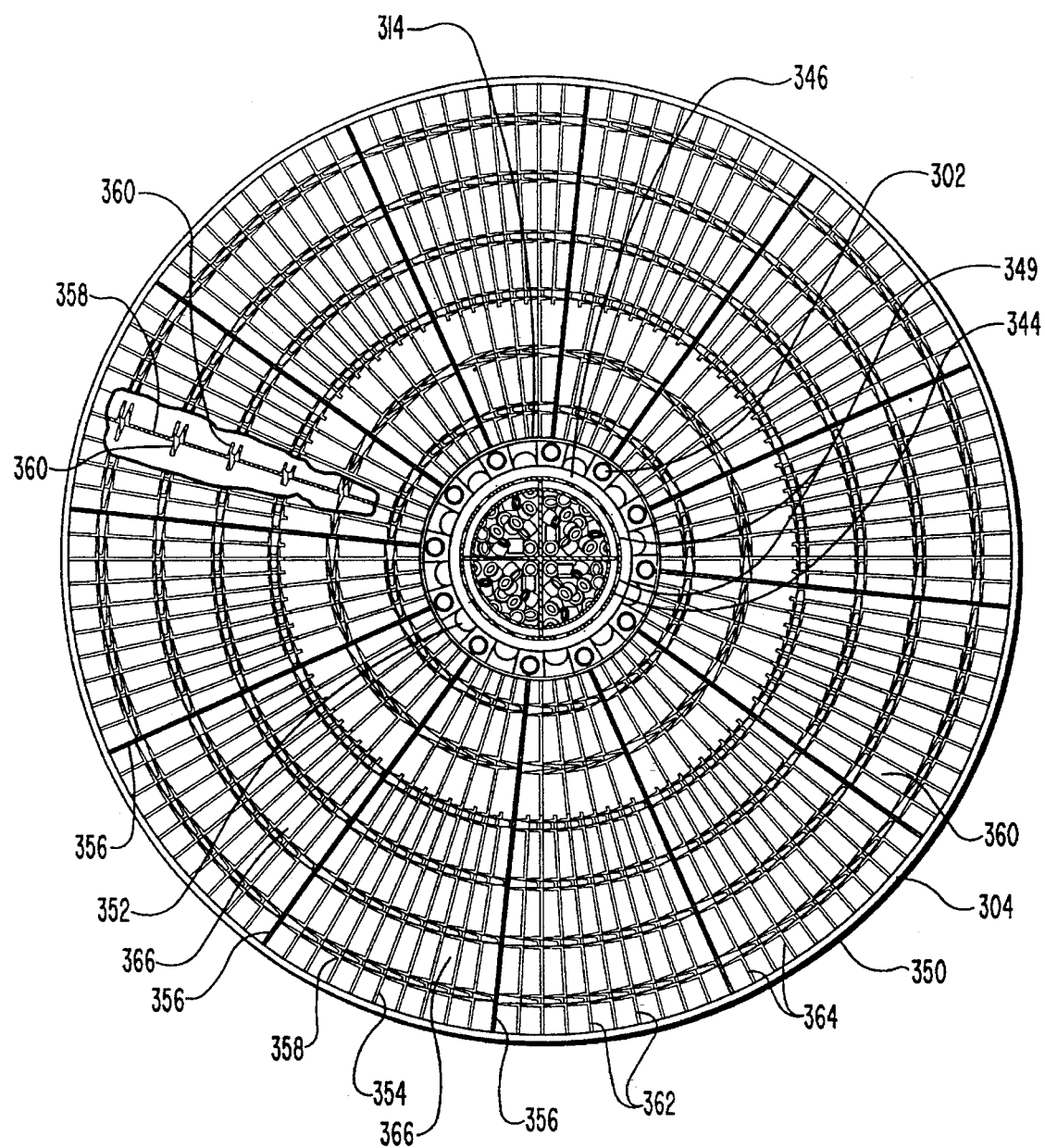
FIG. 10 is a cross-sectional view taken along line 10—10 of FIG. 9.

As illustrated in FIGS. 8 and 9, the rotor 290 includes a separation chamber 350. The separation chamber 350 includes an inlet passageway through which fluids may enter the separation chamber. In this embodiment, the inlet passageway includes a plurality of gaps 352 located in the uppermost portion of the inner wall 339 of the rotor 290, as illustrated in FIGS. 9 and 10. The gaps 352 are located in the spaces between adjacent bolts 302 which attach the upper shaft 294 and the top wall 300 to the upper end of the inner wall 339 of the rotor 290.

The separation chamber 350 includes a plurality of radial plates 354 spaced uniformly within the separation chamber. In accordance with the teachings of the invention, a portion of the plates 354 are made of a material having an affinity for one of the fluids to be separated in the separator. As used herein, a material has an "affinity" for one of the fluids if the interface energy between the material and the fluid is greater than the cohesive energy of the fluid and greater than the interface energy between the other (immiscible) fluid and either component (fluid or solid material).

In this embodiment which is intended for use in removing oil from water, this is accomplished by making at least some of the plates 354 of polypropylene. Polypropylene, being a lipophilic material, has an affinity for oil. Other lipophilic materials, such as polyethylene, could also be utilized.

In this presently preferred embodiment, the radial plates 354 include twelve stainless steel fins 356 which are welded into the rotor 290 at equally spaced locations, and one hundred eight plastic fins 358, as illustrated in FIG. 10. The plastic fins 358 are positioned into the spaces between metal fins 356 and are configured with spacers 360 which matingly engage corresponding spacers 360 on adjacent fins 358 to maintain uniform spacing between the fins 358. As viewed in FIGS. 9 and 10, the spacers 360 are generally evenly distributed along the fins 358 in both the radial and longitudinal directions.

In order to keep the distance between plates 354 approximately constant throughout the separation chamber 350, two sizes of fins 358 are utilized. Long fins 362 extend radially from the inner wall 339 of the rotor 290 to the outer wall 304. At the surface of the inner wall 339 of the separation chamber, the plates 354 are spaced approximately 9.4 millimeters apart. At the radially outward portion of the separation chamber, short fins 364 are placed between adjacent long fins 362 such that the distance between fins at the radially innermost portion of the short fins 364 is also approximately 9.4 millimeters. It is presently preferred that the radial plates not extend into the corners of the separation chamber (FIGS. 8 and 9), particularly where flow is entering or exiting the separation chamber.

The radial plates 354 create a series of radial channels 366 within the separation chamber 350 through which fluid may flow. The radial channels 366 thus span the radial and axial extent of the separation chamber, interrupted only minimally by the spacers 360 (whose distribution is best viewed in FIG. 9). It should be appreciated that the fluid flow characteristics within the channels of the separation chamber may be varied as desired for a particular application, for example, to provide turbulent or laminar flow, by appropriate selection of plate spacing or surface texture. In this preferred embodiment, the number of plates 354 used (one hundred twenty plates) is such that the Reynolds number of the flow through the radial channels 366 will be less than the critical Reynolds number, thereby constraining the flow to be laminar. The radial plates 354 thus perform essentially the same function as the sieve 50 (FIG. 1) and the vanes or ribs 52 (FIG. 2) disclosed in previously described embodiments of the invention.

The separation chamber 350 includes an oil outlet passageway 370 and a water outlet passageway 372, as illustrated in FIG. 8. The oil outlet passageway 370 has an entrance 374 through which the oil may pass to exit the separation chamber 350, as will be explained below. The water outlet passageway 372 also has an entrance, or inlet end, 376 through which the water may pass to exit the separation chamber 350.

The entrance 374 of the oil outlet passageway 370 and the entrance 376 of the water outlet passageway 372 are spaced substantially from the inlet passageway (gap 352 in FIG. 9) to the separation chamber 350. As illustrated in FIG. 8, the entrance 374 of the oil outlet passageway 370 and the entrance 376 of the water outlet passageway 372 are positioned on the opposite end of the separation chamber 350 from the inlet passageway.

As best viewed in FIG. 9, an oil weir 380 is positioned in fluid communication with the oil outlet passageway 370. The oil weir 380 includes a front face 382, a back face 384 and a substantially sharp crest 386 extending substantially annularly about the axis of rotation 292.

Generally, the resistance to flow over the weir is minimized by increasing the sharpness of the crest of the weir. The sharply rising front face and the declining back face allow the maximum flow of fluid over the weir while minimizing and stabilizing the depth of flow over the crest of the weir for a particular flow rate. Thus, by utilizing a weir with a substantially sharp crest, the gas/fluid interface over the crest of the weir is more stable in position for a given flow rate. This is particularly important for the oil weir 380 because of its lesser circumferential length and because the oil (or other fluid passing over the weir 380) is generally more viscous than the other component of the fluid mixture.

The back face 384 of the oil weir 380 forms a truncated cone about the axis of rotation 292. In this embodiment, the cone angle θ is greater than or equal to 30 degrees, as is explained below in greater detail.

In this preferred embodiment, the effective radius of the inner surface of the separation chamber 350 is not substantially less than the radius of the crest 386 of the oil weir 380. Thus, the hub 314 of the rotor 290 is configured with a neck 398 which extends radially inwardly from crest 386 of the oil weir 380. The neck 398 is configured to provide sufficient clearance over the crest 386 of the oil weir 380 to accommodate the flow of oil over the weir and provide an air layer above the flow of oil. Because the effective radius of the inner surface of the separation chamber is not substantially less than the radius of the crest of the first weir, the open air surface over the weir is confined to the vicinity of the oil weir.

The back face 384 of the oil weir 380 is supported by a plurality of equally spaced spokes 392 extending between the back face 384 of the oil weir 380 and the hub 314 of the rotor 290. In this preferred embodiment, four spokes 392, spaced equally about the axis of rotation, are employed. The back face 384 of the oil weir 380 is configured with a plurality of ribs 394 which extend along the lower portion of the back face 384. The ribs 394 extend outwardly approximately in a direction normal to the surface of the back face 384, approximately six millimeters in the preferred embodiment. In this embodiment, 12 ribs are utilized.

With continued reference to FIG. 9, the water outlet passageway 372 extends from its inlet end 376 generally toward the axis of rotation to an exit end 396. The water outlet passageway 372 is partially defined by a water weir 400 extending substantially annularly about the axis of rotation 292. The water weir 400 has a front face 402, a back face 404 and a substantially sharp crest 406 extending substantially annularly about the axis of rotation 292. Thus, the exit end 396 of the water outlet passageway 372 is partially defined by the crest 406 of the water weir 400. The water weir 400 is formed by a radial wall extending inwardly in the radial direction from the outer wall 304 of the rotor 290.

As illustrated in FIGS. 8 and 9, a radial partition 414 is positioned below the water weir 400 and extends annularly about the axis of rotation 292. The radial partition 414 extends radially outwardly from the back of the oil weir 380 and terminates at edge 416 (best seen in FIG. 8).

Figure 11:
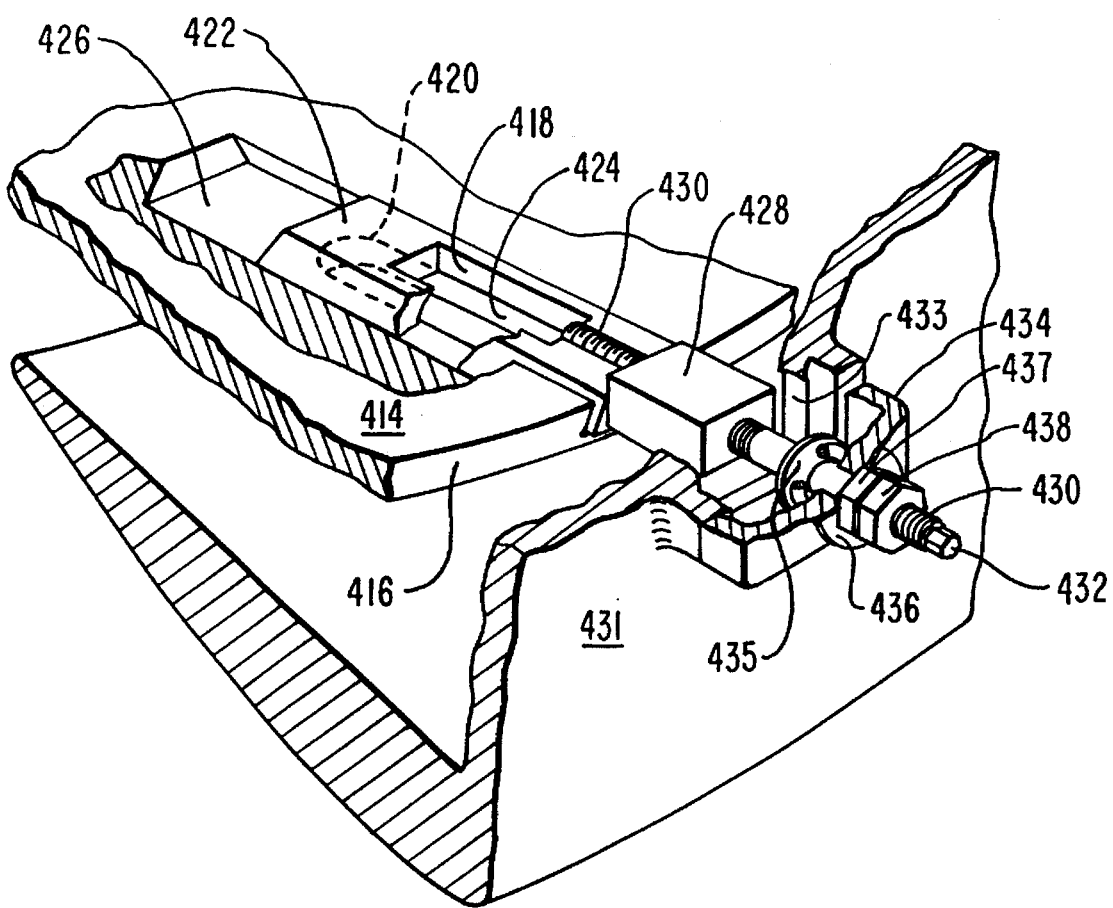
FIG. 11 is a perspective view of one embodiment of the adjustable gas escape passageway of the present invention, with portions broken away to more clearly illustrate the adjustable gas escape passageway.

The radial partition 414 includes a gas escape passageway. In some embodiments, the gas escape passageway comprises the outer edge 416 of the partition 414. In this preferred embodiment, however, the gas escape passageway comprises a hole 418 located in the partition 414, as illustrated in FIG. 11. The radially adjustable hole 418 is formed by configuring the partition 414 with a slot 420. The slot 420 extends along the range of radial locations in the partition 414 for which adjustment of the hole 418 is desired.

A slot cover 422 configured with an elongated hole 424 is positioned to cover the slot such that the hole 424 in the cover 422 and the slot 420 are aligned, thereby permitting gas to pass through the partition 414. The partition 414 includes a recessed portion 426 which is dovetailed to provide for mating engagement with the slot cover 422.

The slot cover 422 is further configured with an end 428 which is drilled and tapped for threaded engagement with an adjustment screw 430. The adjustment screw 430 extends through a circumferential wall 431 and is configured with a hex head at its end 432, thereby permitting the adjustment screw to be easily rotated.

Assembly is facilitated by including an opening 433 in the circumferential wall 431 through which the slot cover 422 may be introduced. A cover plate 434 for sealing the opening 433 is attached to the circumferential wall by conventionally known methods, such as with an O-ring and screws. The adjustment screw 430 is positioned for rotation within the circumferential wall but does not move axially relative to the circumferential wall. This is accomplished by employing a screw 430 which includes a flange 435 positioned on the interior side of the cover plate 434 with a thrust washer 436, a nut 437 and a jam nut 438 located on the outside of the cover plate.

As explained in greater detail below, a gas chamber 440 is positioned in fluid communication with the exit end 396 of the water outlet passageway 372. The gas chamber 440 extends radially outwardly to the gas escape passageway, which in this embodiment is hole 418 in the radial partition 414. A gas introduction passageway is configured in the rotor for providing a supply of gas into the gas chamber 440.

The gas introduction passageway includes a gas tube 442 configured in the shaft 310 of the inlet duct 234. The gas tube 442 may be formed by drilling a hole within the wall of the shaft 310. The gas tube 442 extends to the exterior of the centrifuge where it connects to the gas supply line 258 and is supplied with gas via pump 256 (FIG. 7). At its upper end, the gas tube 442 extends between upper seal 316 and middle seal 318 and on into a cavity 444. The cavity 444 is placed in fluid communication with the gas chamber 440 through a radial tube 446 configured in one of the spokes 392.

As illustrated in FIG. 9, the rotor 290 further includes an exit weir 450 extending substantially annularly about the axis of rotation 292. The exit weir includes a crest 452 over which fluid may flow. The exit weir 450 is formed by an annular plate 454 extending radially inwardly from the lower edge of the circumferential wall 431.

An annular plate 460 is positioned below the exit weir 450 to define a water exit passage 462 between the exit weir 450 and the plate 460 and extending radially outwardly therefrom. Similarly, an oil exit passage 464 is defined between the back face 384 of the oil weir 380 and the hub 314 and extends radially outwardly below the separation wall 474. The oil exit passage 464 thus receives oil passing over the crest 386 of the oil weir 380. The plate 460 thus extends outwardly from the lower portion of the back of the oil weir 380 a sufficient distance to prevent water from passing over the crest 452 of the exit weir 450 from gaining access to the oil exit passage 464.

As illustrated in FIGS. 8 and 9, the water exit passage 462 is further defined by an annular plate 468 attached to the housing 224 and extending radially inwardly generally toward the outermost portion of the exit weir 450. Importantly, a gap 470 is provided between the innermost portion of the plate 468 and the exit weir 450, thereby placing the water exit passage 462 in fluid communication with the annular chamber 472 between the rotor 290 and the housing 224.

An annular separation wall 474 is positioned between the water exit passage 462 and the oil exit passage 464 to prevent the cross contamination of fluids exiting the rotor 290. The separation wall 474 is attached to the housing 224 and extends radially inwardly toward the bottom of the back of the oil weir 380. The separation wall 474 is configured with a cylindrical portion 476 extending upwardly toward the plate 460. The separation wall 474 is positioned to ensure separation of the exiting fluids while providing that the oil exit passage 464 and the water exit passage 462 are maintained in fluid communication with each other, and with the chamber 472.

As illustrated in FIG. 8, a check valve 480 is mounted in the top 230 of the housing 224 to permit ambient air to enter the chamber 472. Likewise, an air vent 482 is mounted in an air intake take tube 486 which extends through the housing 224 and opens into the oil exit passage 464. Air vent 482 preferably permits air to freely enter or exit, but will prevent liquid from exiting through the air vent 482. The maintenance of air pressure equilibration within the centrifuge is assisted by the check valve 480 and the air vent 482 which place the chamber 472 and the oil exit passage 464 in fluid communication with ambient air pressure.

With continued reference to FIG. 8, a water collection chamber 488 is positioned annularly about the axis of rotation 292 and is in fluid communication with the exit weir 450 such that water passing over the exit weir will enter the water collection chamber 488 by way of the water exit passage 462. The water collection chamber 488 is connected directly to the water exit duct 228 (FIG. 7) by which the separated water exits the separator.

An oil collection chamber 490 is likewise positioned annularly about the axis of rotation 292. The oil collection chamber 490 is in fluid communication with the oil weir 380 such that oil passing over the oil weir will enter the oil collection chamber 490 by way of the oil exit passage 464. The oil collection chamber 490 is connected to the oil exit duct 226 (FIG. 7) by which the separated oil exits the separator.

In operation, the separator 220 of the present invention may be utilized to separate two immiscible fluids, such as water which has been contaminated with oil. With reference to FIG. 7, the separator 220 is prepared to receive contaminated fluids by initially turning on the motor 270, the lubrication pump 264 and the air pump 256. In this preferred embodiment, the motor is adjusted to impart an angular velocity to the rotor 290 of approximately 1200 revolutions per minute.

A flow of water/oil mixture 500 may then be introduced into the separator 220 through the inlet duct 234 by pumping the water/oil mixture 500 through the inlet duct 234 (FIG. 7). Generally, an external pump (not shown) will be provided for driving the mixture 500 into the centrifuge. In a presently preferred embodiment, the separator has a maximum flow rate of about 16 liters of mixture per second.

Figure 12:
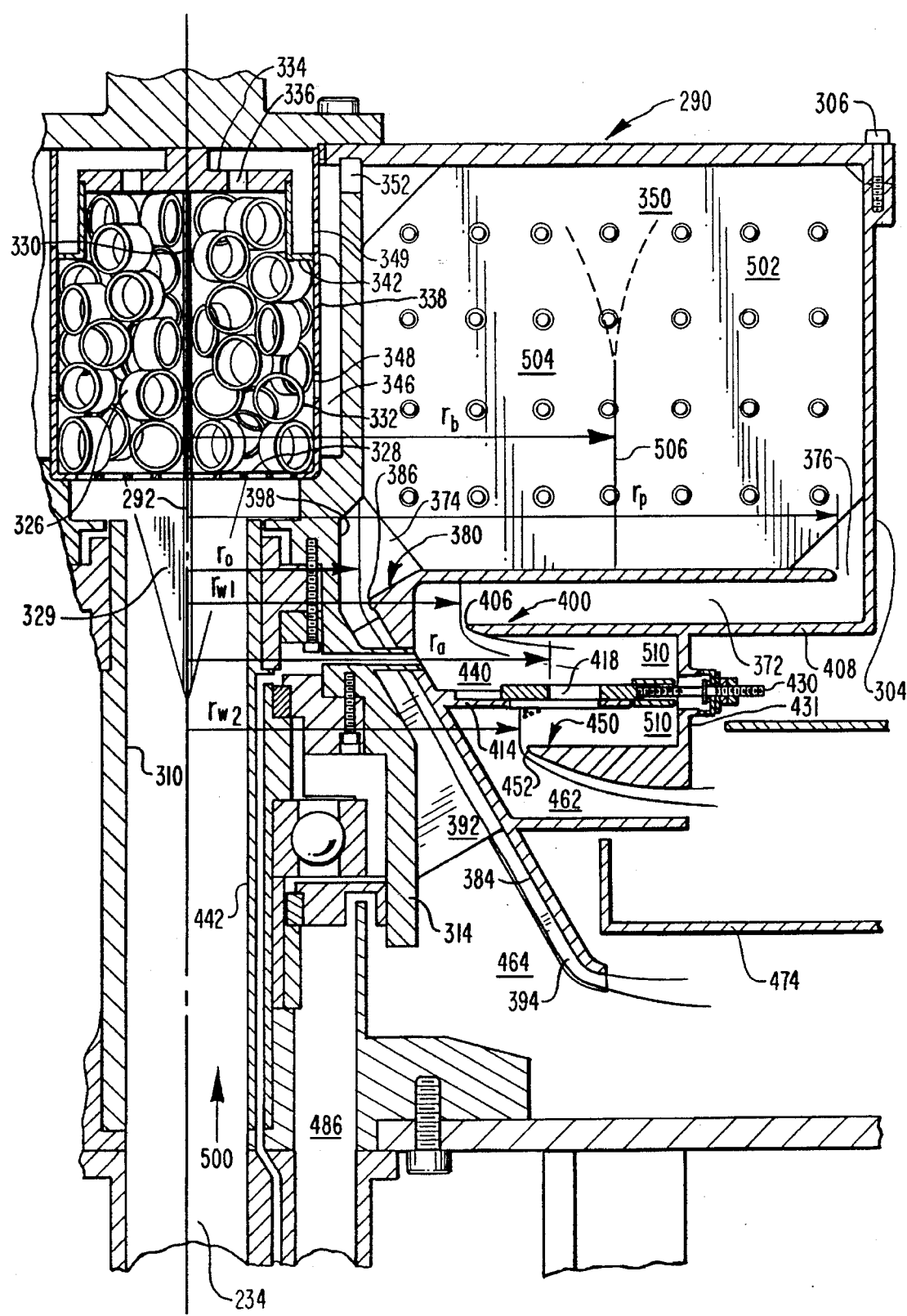
FIG. 12 is a cross-sectional view similar to that of FIG. 9, illustrating the separation chamber and weir structure in operation.

At the receiving end of the inlet duct 234, the mixture passes through screen 235. Any debris having an effective diameter greater than about 0.75 centimeters is prevented from entering the receiving end of the inlet duct 234 by the screen 235. Referring now to FIGS. 9 and 12, the mixture 500 then travels through the inlet duct and enters the mixing chamber 326 by passing through the perforated floor 328. Because the mixing chamber 326 is rigidly mounted to the rotor 290, it is rotating at the same angular velocity as the rotor. Thus, as the mixture 500 enters the mixing chamber 326, it immediately gains the angular velocity of the mixing chamber. Acceleration of the fluid mixture 500 is assisted by the plates 329 and the partitions 330 within the mixing chamber 326.

Separation of the mixture 500 into component parts of water 502 and oil 504 commences within the mixing chamber. Upon entering the mixing chamber 326, the mixture comes into contact with the polyethylene rings 332. The rings 332, being lipophilic, have an affinity for the oil 504. Hence, when small droplets of oil 504 suspended in the water 502 come into contact with the rings 332, they will readily adhere to the rings 332, notwithstanding the g-forces and hydrodynamic forces imposed on the oil droplets.

As the oil droplets continue to accumulate on a ring 332, eventually a sufficient amount of oil will accumulate that the interface energy between the oil and the ring will be overcome by the various forces acting on the fluids within the mixing chamber. At that point, a large droplet will separate from the ring and follow the general flow of fluid through the mixing chamber 326. Thus, by passing the fluid mixture 500 through the mixing chamber 326, many of the oil droplets suspended in the water will be transformed into larger drops which can be readily separated from the water through centrifugation.

The fluid mixture 500 exits the mixing chamber 326 either by passing through openings 336 in the ceiling 334 of the mixing chamber 326, or by passing through lower openings 348 in the outer wall 338. If the mixture exits the mixing chamber through the openings 336 in the ceiling 334, it will then pass through one of the upper openings 349 of the outer wall 338 to enter the annular cavity 346.

From the annular cavity 346, the mixture enters the separation chamber 350 by flowing through gaps 352 at the uppermost portion of the inner wall 339 of the rotor 290. Upon entering the separation chamber 350, the fluid mixture 500 is directed into the radial channels 366 (FIG. 10) defined in the separation chamber 350.

With continued reference to FIGS. 9 and 12, within the separation chamber 350, the fluid mixture is subjected to the substantial g-forces imposed due to the rotation of the rotor. Consequently, the higher density water 502 quickly migrates to the radially outward portion of the separation chamber. The oil 504, having a lesser density than the water, accumulates radially inwardly from the water. An oil/water boundary 506 forms generally vertically and extends annularly about the separation chamber, and is measured as the radial distance $r_b$ from the axis of rotation 292 to the boundary 506 between the oil and the water within the separation chamber.

The oil 504 exits the separation chamber by passing over the crest 386 of the oil weir 380 while the water passes through the water outlet passageway 372 and over the crest 406 of the water weir 400. As pointed out above, the entrance 374 of the oil outlet passageway 370 and the entrance 376 of the water outlet passageway 372 are spaced substantially from the inlet passageway (gaps 352 in FIG. 9) of the separation chamber 350. This configuration enhances the separation efficiency of the separator by providing a long distance—in this embodiment, the entire height of the separation chamber—over which separation may occur.

After passing over the crest of the oil weir, the oil is propelled along the back face 384 of the oil weir as it travels radially through the oil exit passage 464. The ribs 394 ensure that the oil maintains the angular velocity of the rotor as it travels down the back face of the oil weir. Thus, the height of the ribs should be at least equal to the depth of the oil on the back face of the oil weir during operation at maximum flow rate.

Upon its release from the back face 384 and the ribs 394 of the oil weir 380, the oil 504 is propelled at a substantial tangential velocity into the oil collection chamber 490 (FIG. 8). Because of the significant linear velocity imposed on the oil by the rotor 290, the oil readily flows around the oil collection chamber 490 until it reaches the oil exit duct 226 (FIG. 7) at which point it is permitted to follow its natural path (tangential to the circular oil collection chamber 490) and exit the separator.

The spacing between the back face 384 of the oil weir 380 and the opposing portion of the hub 314 of the rotor 290 should also be sufficient to permit the free flow of air in the oil exit passage 464, particularly between the crest 386 of the oil weir and the neck 398 of the hub 314. In this preferred embodiment, approximately two centimeters is provided between the back face 384 of the oil weir and the opposing portion of the hub 314.

The angle between the back face 384 and the axis of rotation 292, defined herein as the angle θ (which is half of the cone angle of the back face 384 of the oil weir 380), is fixed according to the operating conditions of the separator and the structural configuration of the oil weir 380. It has been determined that the minimum angle θ between the back face 384 of the oil weir 380 and the axis of rotation which will support the required flow capacity of the separator can be approximately determined by the following formula:

$$Q = R \frac{Lh\sin\theta}{v} g's, \text{ where } g's = \omega^2 \frac{r}{g_E}, \qquad (4)$$

where Q is the flow rate of the first fluid over the first weir in liters per second, R is a constant equal to 98, L is the length of the first weir in centimeters, h is the height of flow of the first fluid over the crest of the first weir in centimeters, v is the kinematic viscosity of the first fluid in centistokes, $g_E$ is acceleration due to the earth's gravity, r is the radius of the crest of the first weir, and ω is the angular velocity of the separation chamber in radians per second.

By utilizing this formula, the back face 384 can be configured such that the oil exit passage 464 extends radially inwardly of the channels and passageways which accommodate the flow of water out of the separation chamber 350 and into the water collection chamber 488 (FIG. 8). Thus, there is no need for the oil 504 and the water 502 to cross paths as is the case in the embodiment illustrated in FIGS. 1 through 6, thereby substantially facilitating manufacture of the separator.

With continued reference to FIGS. 9 and 12, as the water 502 exits the separation chamber 350 through the water outlet passageway 372, it "rises" toward the axis of rotation 292 to approximately the crest 406 of the water weir 400 and flows over the crest of the water weir and into a fluid pressure chamber 510. The fluid pressure chamber 510 is generally positioned between the radial wall 408 defining the water weir 400 and the annular plate 454 comprising the exit weir 450.

As the water 502 fills the fluid pressure chamber 510, it rises radially inwardly until it reaches the level of the gas escape passageway, which in this embodiment comprises hole 418. The flow of gas, preferably ambient air, from pump 256 (FIG. 7) through the gas tube 442 and the radial tube 446 fills the gas chamber 440 with gas. Thus, a gas barrier is formed to maintain the fluid level between the gas chamber 440 and the fluid pressure chamber 510 at the radial level of the gas escape passageway. A wall of water is thus maintained at the radial position of the hole 418 between the partition 414 and the radial wall 408. The water is forced to exit the fluid pressure chamber 510 by building up to and spilling over the crest 452 of the exit weir 450.

Importantly, the fluid passing over the crest 386 of the oil weir 380 and the fluid passing over the crest 452 of the exit weir 450 each have an air boundary "above" (radially inward) the crest of the weir over which they are passing. As described previously, these two locations are in fluid communication with each other and are generally maintained at the same air pressure. This state of equal air pressure above the crest of the oil weir 380 and above the crest of the exit weir 450 is necessary to achieve optimal performance from the separator.

Upon reaching the crest 452 of the exit weir 450, the water passes over the crest to enter the water exit passage 462. The water 502 generally adheres to the back face of the exit weir 450 until it reaches its end at the circumferential wall 431. At this point, the water is released from the rotor 290 and lands in the water collection chamber 488 with substantial velocity in the direction tangent to the water collection chamber. The water 502 readily flows around the water collection chamber 488 until it reaches water exit duct 228 (FIG. 7) at which point it exits the separator.

The separator of the present invention may also be used to separate an organic component which has been dissolved in an inorganic component, such as trace quantities of an aromatic dissolved in water. This application was also described above in connection with the discussion of the embodiment illustrated in FIG. 6. This "solvent extraction" method of the present invention may be explained with reference to separating water from oil containing benzene contaminants which have dissolved slightly in the water. For purposes of this discussion, the solvent utilized is hexane, it being understood that various other solutions and solvents can be used in accordance with the teachings of the invention.

Initially, the pump 242 is turned on to commence a flow of the hexane solvent into the inlet duct 234 as the contaminated water solution is introduced into the inlet duct, as illustrated in FIG. 7. Within the inlet duct 234, and particularly within the mixing chamber 326, the solvent 237 is mixed with the contaminated water solution. As the mixing occurs, the benzene, being organic, readily comes out of the water and dissolves in the hexane. The hexane/benzene solution, having a density lower than that of the water, is then separated from the water in the centrifuge 222 just as the oil is separated from the water as described above in connection with this embodiment.

This solvent extraction method may also be utilized in a separator having a two-stage construction, such as was described in connection with the embodiment illustrated in FIG. 6. One of skill in the art will appreciate that such a two-stage separator may include many of the features of the embodiment illustrated in FIGS. 7 through 12.

An alternative method of the preferred embodiment of the present invention illustrated in FIGS. 7 through 12 is the use of the device to effect the separation of two immiscible fluids having similar densities but dissimilar viscosities. Such an application could be required when attempting to separate sea water from the stable emulsion which often results when crude oil is spilled into the ocean. This method may also be used to enhance separation of fluids having differing densities and differing viscosities, provided that the more viscous of the two fluids also has the lower density.

In accordance with this "air entrainment" method of the present invention, the air pump 254 is turned on when operating the separator. Air pump 254 provides a continuous supply of gas, preferably ambient air, through the gas supply line 250 which is injected into the inlet duct 234 at injector 252. Injector 252 is preferably configured such that the air is injected into the fluid mixture in the form of tiny bubbles to produce a gas-entrained liquid mixture.

As the gas-entrained liquid mixture enters the separation chamber, as illustrated in FIG. 12, the bubbles, having a substantially lower density than water, will quickly tend to migrate radially inward. As the bubbles move through the emulsion/water mixture, the frictional forces between the bubbles and the viscous emulsion are much greater than the frictional forces between the bubbles and the water. Consequently, the bubbles will tend to "carry" the emulsion radially inward. In other words, the air bubbles reduce the effective density of the emulsion, thereby permitting the separator to separate the two fluids on the basis of their density differential. A portion of the gas introduced into the emulsion/water mixture exits the separator through air vent 482 (FIG. 8) in fluid communication with the flow of the viscous component which passes over the first weir.

The amount the effective density of the emulsion is changed depends on the volume of air which is injected into the inlet duct 234. It is presently preferred that the flow rate of air injected when utilizing the air entrainment method of the present invention be approximately 10 percent of the volume of the fluid mixture entering the separator.

The particular application for which the separator 220 of the present invention is being utilized may influence the relative positioning of the weirs and other structural components of the separator. It has been determined that the radial position of the oil/water boundary 506 as a function of the surface of the oil as it approaches the crest 386 of the oil weir 380 and other physical characteristics may generally be determined by the following formula:

$$r_b = \sqrt{\frac{\rho_w r_x^2 - \rho_o r_o^2}{\rho_w - \rho_o}}, \qquad (5)$$

where $r_o$ is the radial distance from the axis of rotation 292 to the surface of the oil as it approaches the crest 386 of the oil weir 380, $\rho_w$ is the effective density of the water 502 (as affected by any entrained air), $\rho_o$ is the effective density of the oil 504 (as affected by any entrained air), and $r_b$ is the radial distance from the axis of rotation 292 to the interface between the oil 504 and water 502 within the separation chamber 350, and where $r_x$ is given by the following formula:

$$r_x^2 = r_{w1}^2 + r_{w2}^2 - r_a^a, \qquad (6)$$

where $r_{w1}$ is the radial distance from the axis of rotation 292 to the surface of the water as it approaches the crest 406 of the water weir 400, $r_{w2}$ is the radial distance from the axis of rotation 292 to the surface of the water as it approaches the crest 452 of the exit weir 450, and $r_a$ is the radial distance from the axis of rotation 292 to the edge about which gas from the gas chamber 440 may pass to exit the gas chamber, i.e., the radially inward portion of the hole 418. The equations (5) and (6) are improved over the previous equations (1) and (2) so as to correct for movement of the boundary position $r_b$ due to the applied force of the fluid pressure chamber. It will be recognized by those skilled in the art that the terms of equation (6) may be regarded to have units of pressure divided by $\rho \omega^2$, and that the equations (5) and (6) are an expression of pressure balance within the separator; indeed, the portion $r_{w2}^2 - r_a^2$ represents the pressure impressed upon the gas chamber by the column of fluid in the fluid pressure chamber between levels $r_{w2}$ and $r_a$.

From the above formulas, it can be determined that the separator will effectively separate fluids having the greatest range of differential densities by minimizing $r_x$ (which can be visualized as the radial distance to which water will rise within the separation chamber 350 if it is the only fluid being pumped through the separator). Consequently, the radial position of the adjustable hole 418 may be adjusted by running only water through the separator and gradually moving the hole outward until water begins exiting through the oil collection chamber 490—indicating that water is passing over the oil weir 380. The positioning of the hole 418 may then be moved inward slightly, such as about two millimeters. One of skill in the art will appreciate, however, that various applications may require a different method for determining the optimal positioning of the hole 418.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of separating into its component parts a mixture including a first liquid and a second liquid, the first liquid having a viscosity greater than the second liquid, comprising the steps of:

dispersing bubbles of a gas into the liquid mixture to produce a gas-entrained liquid mixture;

introducing the gas-entrained liquid mixture into a separator including:

a separation chamber mounted for rotation about an axis of rotation, the separation chamber including an inlet passageway, a first fluid outlet passageway, and a second fluid outlet passageway;

a first weir positioned in fluid communication with the first fluid outlet passageway of the separation chamber; and a second weir positioned in fluid communication with the second fluid outlet passageway of the separation chamber;

spinning the gas-entrained liquid mixture in the separation chamber about the axis of rotation to force the first liquid and the gas to migrate radially inwardly in the separation chamber while the second liquid and any remaining gas migrates radially outwardly in the separation chamber;

permitting at least a portion of the gas and the first liquid to exit the separation chamber by passing over the first weir and out the first fluid outlet passageway; and permitting at least a portion of the second liquid and any remaining gas to exit the separation chamber by passing over the second weir and out the second fluid outlet passageway.

2. A method of separating into its component parts a mixture including a first liquid and a second liquid as defined in claim 1, wherein the separator additionally includes an inlet duct and the step of introducing the gas-entrained liquid mixture into a separator includes introducing the gas-entrained liquid mixture into the inlet duct.

3. A method of separating into its component parts a mixture including a first liquid and a second liquid as defined in claim 1, wherein the step of dispersing bubbles of a gas in the liquid mixture to produce a gas-entrained liquid mixture includes injecting a gas into the liquid mixture and mixing the gas with the liquid mixture in a mixing chamber configured with flow disruption elements configured to induce turbulent flow of the fluid in the mixing chamber.

4. A method of separating into its component parts a mixture including a first liquid and a second liquid as defined in claim 1, further comprising the step of permitting a portion of the gas introduced into the liquid mixture to exit the separator through an air vent in fluid communication with the flow of the first liquid which passes over the first weir.

5. A method of separating into its component parts a mixture including a first liquid and a second liquid, the first liquid having a viscosity greater than the second liquid, comprising the steps of:

dispersing bubbles of a gas into the liquid mixture to produce a gas-entrained liquid mixture;

introducing the gas-entrained liquid mixture into an inlet duct of a separator, the separator further including:

a separation chamber mounted for rotation about an axis of rotation, the separation chamber including an inlet passageway, a first fluid outlet passageway, and a second fluid outlet passageway;

a first weir positioned in fluid communication with the first fluid outlet passageway of the separation chamber; and a second weir positioned in fluid communication with the second fluid outlet passageway of the separation chamber;

spinning the gas-entrained liquid mixture in the separation chamber about the axis of rotation to force the first liquid and the gas to migrate radially inwardly in the separation chamber while the second liquid and any remaining gas migrates radially outwardly in the separation chamber;

permitting at least a portion of the gas and the first liquid to exit the separation chamber by passing over the first weir and out the first fluid outlet passageway; and permitting at least a portion of the second liquid and any remaining gas to exit the separation chamber by passing over the second weir and out the second fluid outlet passageway.

6. A method of separating into its component parts a mixture including a first liquid and a second liquid as defined in claim 5, wherein the step of dispersing bubbles of a gas in the liquid mixture to produce a gas-entrained liquid mixture includes injecting a gas into the liquid mixture and mixing the gas with the liquid mixture in a mixing chamber configured with flow disruption elements configured to induce turbulent flow of the fluid in the mixing chamber.

7. A method of separating into its component parts a mixture including a first liquid and a second liquid as defined in claim 5, further comprising the step of permitting a portion of the gas introduced into the liquid mixture to exit the separator through an air vent in fluid communication with the flow of the first liquid which passes over the first weir.

8. A method of separating into its component parts a mixture including a first liquid and a second liquid, the first liquid having a viscosity greater than the second liquid, comprising the steps injecting a gas into the liquid mixture and mixing the gas with the liquid mixture in a mixing chamber configured with flow disruption elements configured to induce turbulent flow of the fluid in the mixing chamber and thereby produce a gas-entrained liquid mixture;

introducing the gas-entrained liquid mixture into a separator including:

a separation chamber mounted for rotation about an axis of rotation, the separation chamber including an inlet passageway, a first fluid outlet passageway, and a second fluid outlet passageway;

a first weir positioned in fluid communication with the first fluid outlet passageway of the separation chamber; and a second weir positioned in fluid communication with the second fluid outlet passageway of the separation chamber;

spinning the gas-entrained liquid mixture in the separation chamber about the axis of rotation to force the first liquid and the gas to migrate radially inwardly in the separation chamber while the second liquid and any remaining gas migrates radially outwardly in the separation chamber;

permitting at least a portion of the gas and the first liquid to exit the separation chamber by passing over the first weir and out the first fluid outlet passageway; and permitting at least a portion of the second liquid and any remaining gas to exit the separation chamber by passing over the second weir and out the second fluid outlet passageway.

9. A method of separating into its component parts a mixture including a first liquid and a second liquid as defined in claim 8, further comprising the step of permitting a portion of the gas introduced into the liquid mixture to exit the separator through an air vent in fluid communication with the flow of the first liquid which passes over the first weir.

10. A method of separating into its component parts a mixture including a first liquid and a second liquid as defined in claim 9, wherein the separator additionally includes an inlet duct and the step of introducing the gas-entrained liquid mixture into a separator includes introducing the gas-entrained liquid mixture into the inlet duct.

* * * * *